United States Patent
Yu et al.

(10) Patent No.: US 7,940,812 B2
(45) Date of Patent: May 10, 2011

(54) ETHERNET ACCESS DEVICE AND ETHERNET ACCESS METHOD

(75) Inventors: Yang Yu, Hangzhou (CN); Xiang Lin, Hangzhou (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 691 days.

(21) Appl. No.: 11/921,234

(22) PCT Filed: May 29, 2006

(86) PCT No.: PCT/CN2006/001138
§ 371 (c)(1), (2), (4) Date: Nov. 29, 2007

(87) PCT Pub. No.: WO2006/128369
PCT Pub. Date: Dec. 7, 2006

(65) Prior Publication Data
US 2009/0232133 A1    Sep. 17, 2009

(30) Foreign Application Priority Data

May 31, 2005  (CN) .......................... 2005 1 0073308
Apr. 30, 2006  (CN) .......................... 2006 1 0078687

(51) Int. Cl.
*H04J 3/04* (2006.01)
*H04J 3/02* (2006.01)
*H04J 3/16* (2006.01)

(52) U.S. Cl. ......... 370/532; 370/535; 370/537; 370/469

(58) Field of Classification Search ............... 370/395.5, 370/469, 532, 542, 544, 907
See application file for complete search history.

(56) References Cited

U.S. PATENT DOCUMENTS

| | | | |
|---|---|---|---|
| 5,251,210 A * | 10/1993 | Mann et al. .................. | 370/519 |
| 6,188,699 B1 | 2/2001 | Lang et al. | |
| 6,498,798 B1 * | 12/2002 | Krishnamoorthy et al. .. | 370/537 |
| 6,577,649 B1 * | 6/2003 | Leibowitz et al. ............ | 370/503 |
| 6,690,682 B1 * | 2/2004 | Giaretta et al. ............... | 370/535 |
| 6,788,682 B1 * | 9/2004 | Kimmitt ....................... | 370/389 |
| 6,980,563 B2 | 12/2005 | Barker et al. | |
| 7,496,115 B2 * | 2/2009 | Choi et al. .................... | 370/535 |
| 7,590,118 B2 * | 9/2009 | Giesberts et al. ............. | 370/392 |
| 2001/0050921 A1 * | 12/2001 | Barker et al. ................. | 370/465 |
| 2001/0053161 A1 * | 12/2001 | Tomizawa et al. ............ | 370/538 |

(Continued)

FOREIGN PATENT DOCUMENTS

CN         1474550 A        2/2004

(Continued)

*Primary Examiner* — Warner Wong
(74) *Attorney, Agent, or Firm* — Bacon & Thomas, PLLC

(57) ABSTRACT

The present invention discloses an Ethernet access device and method thereof. The device includes at least two downlink physical port units, a multiplex/demultiplex unit and an uplink physical port unit. The downlink physical port unit is adapted to convert between a low-speed physical layer signal input to/output from the access device and a low-speed physical layer load carried therein; the uplink physical port unit is adapted to convert a high-speed physical layer signal input to/output from the access device and a high-speed physical layer load carried therein; and the multiplex/demultiplex unit is adapted to multiplex and demultiplex between the low-speed physical layer load of the downlink physical port unit and the high-speed physical layer load of the uplink physical port unit.

10 Claims, 11 Drawing Sheets

U.S. PATENT DOCUMENTS

| | | | |
|---|---|---|---|
| 2002/0080830 A1* | 6/2002 | Carson et al. | 370/542 |
| 2004/0057469 A1* | 3/2004 | Nuss et al. | 370/535 |
| 2005/0036524 A1* | 2/2005 | Wojtowicz | 370/537 |
| 2006/0034292 A1* | 2/2006 | Wakayama et al. | 370/395.5 |
| 2006/0056298 A1* | 3/2006 | Nag et al. | 370/230 |
| 2006/0268939 A1* | 11/2006 | Dries et al. | 370/498 |

FOREIGN PATENT DOCUMENTS

| | | |
|---|---|---|
| KR | 460672 | 12/2004 |
| WO | WO 2005/018120 A1 | 2/2005 |

* cited by examiner

ETHERNET ACCESS DEVICE AND ETHERNET ACCESS METHOD

FIELD OF THE INVENTION

The present invention relates to Ethernet access technologies, in particular, to an Ethernet access device and a method thereof.

BACKGROUND OF THE INVENTION

With the rapid development of Internet, especially with the rise of new services such as Internet Protocol Television (IPTV), the problem of Last Mile Access of terminal users becomes a bottleneck of the development of new services. The current predominant access technology, Asymmetrical Digital Subscriber Loop (ADSL), cannot provide a sufficient bandwidth. Therefore, at present, a study is made on technologies such as Very High Bit-Rate Digital Subscriber Loop (VDSL) and ADSL2+ (ITU Standard G.992.5) to solve the above problem. But these new technologies are still not mature enough, the cost per user for the commercial application is still very high, thus service providers dare not employ the technologies hastily. Therefore, the ADSL access is still predominant in the current broadband access market.

The Ethernet technology is very mature, and as the techniques of chip manufacturers develop rapidly, the transmission distance is increased greatly, so new opportunities are brought to the application of Ethernet to the broadband access. FIG. 1 shows the typical structure of an Ethernet access system used for a terminal user to access a broadband network in the prior art, wherein layer-2 switch 810 is used as an access equipment, layer-3 switch 820 is used as a gateway, and an access terminal accesses gateway 820 via layer-2 switch 810. Layer-2 switch 810 performs the layer-2 forwarding between a user and gateway 820, and the layer-2 isolation is accomplished between access terminals. Other operations, such as Quality of Service (QoS), may be accomplished at gateway 820.

In the field of the broadband access, average bandwidth of each user is low. For example, a bandwidth of 10 M may meet over 80% of the broadband access applications. However, the bandwidth of Ethernet products, such as Media Access Control (MAC) chip and long-distance transmission medium, has been developed to 1 G and 10 G to meet the requirement of enterprise network applications, and the price is considerably advantageous with respect to the bandwidth. But a lot of bandwidth will be wasted if the products are directly applied to the broadband access. Referring to FIG. 1, the equipment cost on the user side is still very high, and service providers cannot lower the access equipment cost per user when the network is disposed based on the solution. Moreover, in the current application, service providers need to dispose a lot of layer-2 switches at a position nearest to the user side. To guarantee that an access service can be activated to each possible user when the user needs to access an Internet service, these layer-2 switches usually have an access capacity of tens of ports, the number of the ports being usually equivalent to or even larger than that of the families nearby. But the access activation rate is usually very low, and is usually less than 10 families in a building. Thus, the cost of a layer-2 Ethernet switch will be laid on several users. Apparently, the cost will be too high. This is one of the key reasons why the mature Ethernet technologies cannot be widely used in Internet access applications.

It is a problem concerned by service providers that how to lower the cost of Ethernet access equipment. For equipment providers, because the market of Ethernet has been rather mature and the prices of various commercial chips cannot be lowered greatly, other approaches must be found to lower the cost of the equipment.

IBM simplifies the Ethernet switch to a certain extent by novelly using the multiplex technology. For details, reference may be made to US Patent Publication No. 20010050921 filed by IBM, in which a method for realizing a physical layer TDM is disclosed. In the method, signals input to several low-speed physical ports on a physical layer chip within a certain time period are collected circularly and multiplexed into a high-speed digital signal on one channel, and then the high-speed digital signal is transmitted to an MAC chip for layer-2 processing; which is opposite to the processing for digital signals output from the MAC chip. Therefore, the overall cost may be lowered correspondingly by lowering the number of MAC chips in the Ethernet switch and substituting a 100 M/GE MAC chip for a plurality of 10 M/100 M MAC chips.

The difference between the Ethernet multiplex technology disclosed in the patent application and the conventional Ethernet-related multiplex technology lies in that, the multiplex technology disclosed in the patent application intends to solve the problem of internal simplification of Ethernet switch, on the other hand, other Ethernet technologies intend to solve the problem of the high cost of the Ethernet transmission physical link or the problem that data cannot be directly output from a 10 GE physical channel because the equipment does not support 10 GE data processing capability. For example, 10 GE channels are multiplexed via a multiplex device, to one 10 GE channel for transmission, and the corresponding GE channels are demultiplexed and recovered on the other end.

This patent application submitted by IBM may solve the problem of Ethernet equipment simplification to a certain extent. Therefore, the reliability of the equipment may be improved and the overall cost of the equipment may be lowered.

If the technology is applied to the broadband access, the problem of the high cost of service providers may be released to a certain degree. However, the optimization effect is limited, because the access equipment has many MAC layers and upper-layer functional chipsets according to the prior art. Therefore, to make Ethernet broadband access become the predominant access approach, the overall cost of the access equipment should be further lowered.

SUMMARY OF THE INVENTION

The invention provides an Ethernet access device and an Ethernet access method, so as to low the cost and simplify the equipment architecture.

One aspect of the invention provides an Ethernet access device, located between a plurality of access nodes and a gateway equipment, including at least two downlink physical port units, a multiplex/demultiplex unit and an uplink physical port unit, wherein the downlink physical port unit is adapted to perform a conversion between a low-speed physical layer signal input to or output from the access device and a low-speed physical layer load carried in the low-speed physical layer signal;

the uplink physical port unit is adapted to perform a conversion between a high-speed physical layer signal input to or output from the access device and a high-speed physical layer load carried in the high-speed physical layer signal; and the multiplex/demultiplex unit is adapted to perform a multiplex or a demultiplex for the low-speed physical layer load of the downlink physical port unit and the high-speed physical layer load of the uplink physical port unit.

the lowest-level downlink physical port unit is connected with the downlink interface of the lowest-level multiplex unit for performing a conversion between a low-speed physical layer signal input to or output from the access device and a low-speed physical layer load carried therein;

the upmost-level uplink physical port unit is connected with the uplink interface of the upmost-level multiplex unit for performing a conversion between a high-speed physical layer signal input to or output from the access device and a high-speed physical layer load carried therein; and the at least two levels of multiplex units are adapted to perform a multiplex and a demultiplex level by level between the low-speed physical layer load at the downlink interface of the lowest-level multiplex unit and the high-speed physical layer load at the uplink interface of the upmost-level multiplex unit.

Another aspect of the invention provides a method for Ethernet access, including:

multiplexing physical layer loads carried in physical layer signals of at least two access nodes into a physical layer load on one channel;

converting a multiplexed physical layer load into a high-speed physical layer signal, and then transmitting the high-speed physical layer signal in uplink;

demultiplexing the multiplexed physical layer load on one channel carried in the downlink high-speed physical layer signal into physical layer loads corresponding to at least two access nodes; and converting demultiplexed physical layer loads into low-speed physical layer signals, and then transmitting the low-speed physical layer signals in downlink.

Another aspect of the invention provides an Ethernet access conversion device, located between an access device and a gateway equipment, including an access-side physical port unit, a multiplex conversion unit and a gateway-side physical port unit;

the access-side physical port unit is adapted to perform a conversion between a physical layer signal and multiplex physical layer loads carried therein, which are transmitted between the access conversion device and the access device;

the gateway-side physical port unit is adapted to perform a conversion between a physical layer signal and the physical layer load carried therein, which are transmitted between the access conversion device and the gateway equipment, in the unit of a data frame; and the multiplex conversion unit is adapted to perform a conversion between the multiplex physical layer load of the access-side physical port unit and the physical layer load of the gateway-side physical interface unit in the unit of the data frame.

Another aspect of the invention provides a multiplex gateway equipment, including a physical port unit, a multiplex interface unit and a forwarding unit, wherein:

the physical port unit is adapted to perform a conversion between a physical layer signal of an input/output multiplex gateway equipment and a multiplex MAC layer code stream carried in the physical layer signal;

the multiplex interface unit is adapted to convert the multiplex MAC layer code stream received from the physical port unit into a data frame and output the data frame to the forwarding unit, and inversely convert the data frame received from the forwarding unit into a multiplex MAC layer code stream and output the multiplex MAC layer code stream to the physical port unit; and the forwarding unit is adapted to forward the data frame.

In the invention, the loads of multiple physical layer signals, i.e., the physical layer loads carried therein, are multiplexed, and the multiplexed physical layer load is transmitted after processed by the physical layer. The architecture of the access device can be simplified while the functions of the access equipment between a gateway and a user can be maintained. Hence, the access equipment is simplified, and the reliability of the access equipment can be improved correspondingly.

DETAILED DESCRIPTION OF THE EMBODIMENTS

Different from the application of the enterprise network, an access node in an access network communicates with an exterior network mainly via a gateway equipment, and the direct communication seldom occurs between access nodes. The requirements of the access network is met when the access equipment between the gateway equipment and the access node can provide an uplink and downlink transmission function, in other words, the signal sent by the access node can be transmitted in uplink to the gateway equipment and the signal sent by the gateway equipment can be transmitted in downlink to the destination access node. However, in a layer-2 switch, the function of forwarding packets between downlink ports is basically in an idle state in the access network. If a few access nodes need to communicate directly, the forwarding function may be accomplished via the gateway equipment. Therefore, the multiplexing may be performed on the access node side, and the multiplexed signal may be transmitted in a long distance to the gateway equipment. The solution for implementing the forwarding function only on the gateway equipment is a solution suitable for the access system and with a low access cost.

Another difference from the application of the enterprise network lies in that: in the field of the broadband access, the distribution of node users is very wide, and the access rate and transmission medium needed are usually different from each other. In the multiplex technology, the higher the level of the data to be multiplexed is in the Open system Interconnection (OSI) 7-layer model, the higher the complexity and the cost of the transmission for returning the multiplexed data to the physical layer will be. Considering the diversity and realization of the application environment of the access system, the multiplexing of the physical layer loads not only can meet the application requirements, but also can lower the access cost as much as possible.

As described above, in the invention, the physical layer loads are multiplexed. The code stream in the present application refers to the physical layer load or part of the physical layer load.

Figure 1:
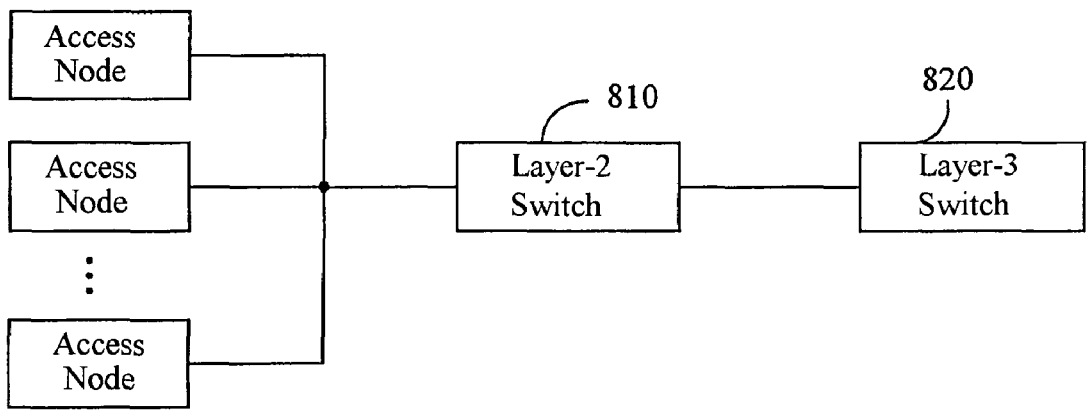
FIG. 1 is a structural diagram of the Ethernet access system in the prior art.
Figure 2:
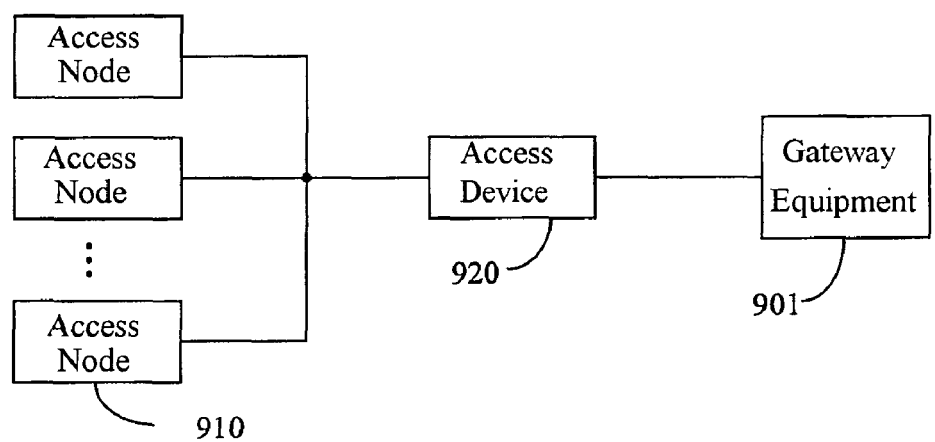
FIG. 2 is a structural diagram of the first Ethernet access system according to an embodiment of the invention.
Figure 3:
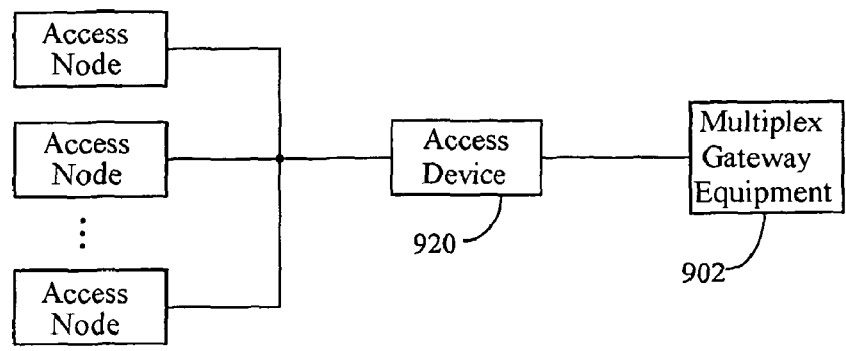
FIG. 3 is a structural diagram of the second Ethernet access system according to an embodiment of the invention.
Figure 4:
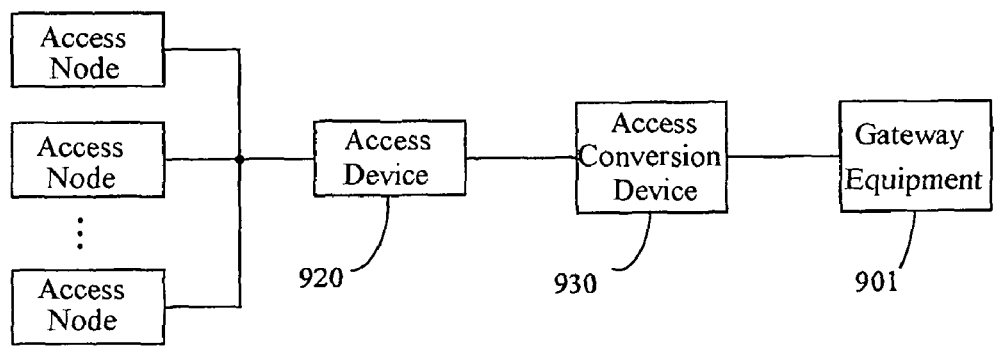
FIG. 4 is a structural diagram of the third Ethernet access system according to an embodiment of the invention.

In the invention, because the multiplex technology employed is different, the Ethernet access system may have the structure shown in FIG. 2, FIG. 3 or FIG. 4, wherein access device 920 multiplexes the uplink physical layer loads and converts the uplink physical layer loads into a physical layer signal, then transmits the physical layer signal to the gateway side and transmits the downlink signal on the gateway side to destination access node 910.

In the first Ethernet access system shown in FIG. 2, access device 920 is connected with gateway equipment 901 directly, and the existing gateway equipment does not need to be modified in the system. In the second Ethernet access system shown in FIG. 3, access device 920 is connected with multiplex gateway equipment 902, and multiplex gateway equipment 902 and access device 920 employ a cooperated multiplex technology to realize the access. In the third Ethernet access system shown in FIG. 4, access conversion device 930 is added between access device 920 and gateway equipment 901 as an interface between access device 920 and gateway equipment 901, so that the multiplex technology of access device 920 is transparent to gateway equipment 901.

FIG. 5 to FIG. 8 are structural diagrams showing the first embodiment to the fourth embodiment of the access device according to the invention. With reference to the figures, downlink physical port units 111, 112 to 11$k$ are connected to multiplex/demultiplex unit 120 respectively, and uplink physical port unit 130 is also connected to multiplex/demultiplex unit 120. It should be noted that: although k physical port units are shown, the above four embodiments may support at least two downlink physical port units.

In these four embodiments, each of downlink physical port units 111, 112 to 11$k$ may be connected with an access node for resolving the low-speed physical layer load carried in each low-speed physical layer signal input to the access device and outputting the low-speed physical layer load to multiplex/demultiplex unit 120. Multiplex/demultiplex unit 120 multiplexes each low-speed physical layer load into the high-speed physical layer load on one channel and outputs the high-speed physical layer load to uplink physical port unit 130. Uplink physical port unit 130 sends a high-speed physical layer signal carrying the high-speed physical layer load out of the access device. After uplink physical port unit 130 receives the high-speed physical layer signal, uplink physical port unit 130 resolves the high-speed physical layer load from the high-speed physical layer signal and outputs the high-speed physical layer load to multiplex/demultiplex unit 120. Multiplex/demultiplex unit 120 demultiplexes the high-speed physical layer load into the low-speed physical layer load corresponding to each downlink physical port unit, and outputs each low-speed physical layer load to a corresponding downlink physical port unit, and the downlink physical port unit receives the low-speed physical layer load and converts the low-speed physical layer load into a low-speed physical layer signal and then outputs from the low-speed physical layer signal to the access device.

The first embodiment to the fourth embodiment employs different multiplex technologies, so that the internal implementation of multiplex/demultiplex unit 120 are different. In the first embodiment and the second embodiment, the multiplexing is performed according to the traffic reaching the downlink physical port unit, and the demultiplexing is performed according to a tag in the physical layer load corresponding to the downlink physical port unit. In the third embodiment and the fourth embodiment, the multiplexing and the demultiplex are performed circularly according to a time sequence period, and the time sequence period is disassembled into time slots corresponding to the downlink physical port units, and each time slot is dedicated to a corresponding downlink physical port unit. If the corresponding downlink physical port unit has no network traffic currently, the corresponding downlink physical port unit will be filled with an idle signal, rather than multiplexing the physical layer loads of other downlink physical port units. The idle signal may be an idle signal in accordance with the Ethernet standard or an idle signal agreed on by the two communicating parties.

Figure 5:
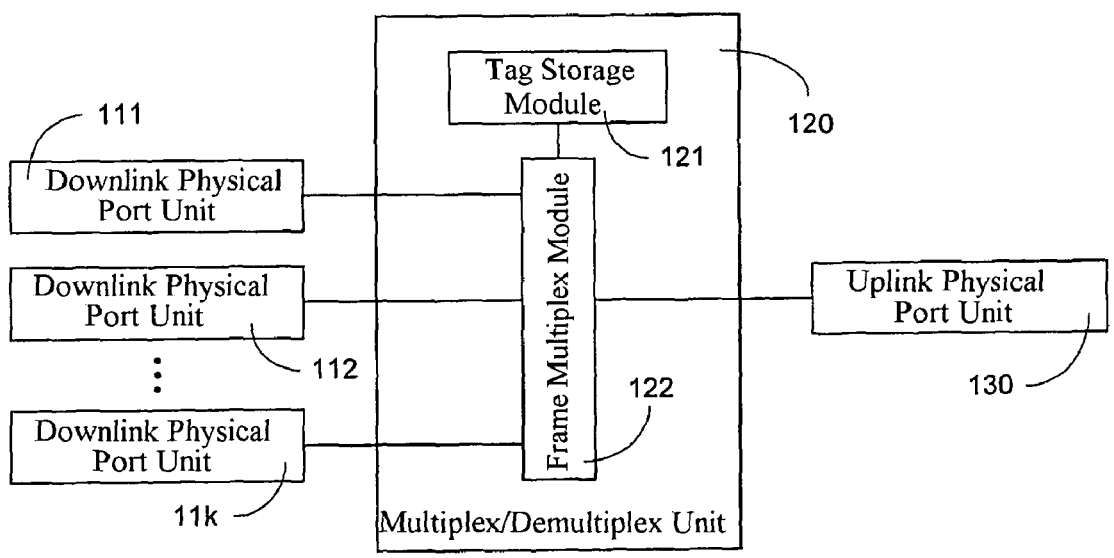
FIG. 5 is a structural diagram of the first embodiment of the access device according to the invention.

FIG. 5 shows the structural diagram of the first embodiment of the access device according to the invention. Multiplex/demultiplex unit 120 includes tag storage module 121 and frame multiplex module 122. Frame multiplex module 122 is connected with downlink physical port unit, tag storage module 121 and uplink physical port unit 130, respectively.

In this embodiment, a field in the data frame, which has a one-to-one correlation with the access node, is taken as a tag. Because each access node is connected with the access device via a downlink physical port unit, the tags in the physical layer load transmitted via downlink physical port units are different. In the invention, data frame refers to an MAC layer data frame of Ethernet standard and is included in the physical layer load. The tag may be a field in the data frame, such as MAC address and Internet Protocol (IP) address of the access node.

A downlink physical port unit converts the received physical layer signal into a physical layer load and sends the physical layer load to frame multiplex module 122. Frame multiplex module 122 checks whether the tag in the data frame and the corresponding downlink interface have been saved in tag storage module 121. If the tag and the corresponding downlink interface have not been saved or have changed, tag storage module 121 will be updated, so that a correlation between the current tag and the downlink physical port unit will be maintained in tag storage module 121. Then it will be converted into a high-speed physical layer load and output to uplink physical port unit 130. Uplink physical port unit 130 sends the high-speed physical signal carrying the high-speed physical layer load out of the access device.

Uplink physical port unit 130 converts the received high-speed physical layer signal into a physical layer load and sends the physical layer load to frame multiplex module 122. Frame multiplex module 122 searches the downlink physical port unit corresponding to the tag in the data frame of the high-speed physical layer load, converts the high-speed physical layer load into a low-speed physical layer load and outputs the low-speed physical layer load to the downlink physical port unit. The downlink physical port unit sends a low-speed physical layer signal carrying the low-speed physical layer load out of the access device.

Frame multiplex module 122 has a function of resolving a data frame from a physical layer load and a function of tag learning. The two functions may be implemented using the conventional realization method in the MAC chip. For the function of performing a conversion between high-speed and low-speed physical layer loads of frame multiplex module 122, a segment of buffer region may be opened for downlink physical port unit and uplink physical port unit 130 respectively in frame multiplex module 122, and transmission rate conversion may be implemented via high and low speed clocks in the unit of a physical layer load including a complete data frame.

By using the multiplexing method according to the embodiment, the physical layer signal input to/output from the access device carries a physical layer load including a complete data frame and is in accordance with the Ethernet standard. The access device may be directly connected with a standard gateway equipment, and is applicable for the first Ethernet access system shown in FIG. 2. However, in the multiplexing method, the access device needs to resolve the data frame on MAC layer, thus some layer-2 processing capabilities need to be embedded into the access device.

Figure 6:
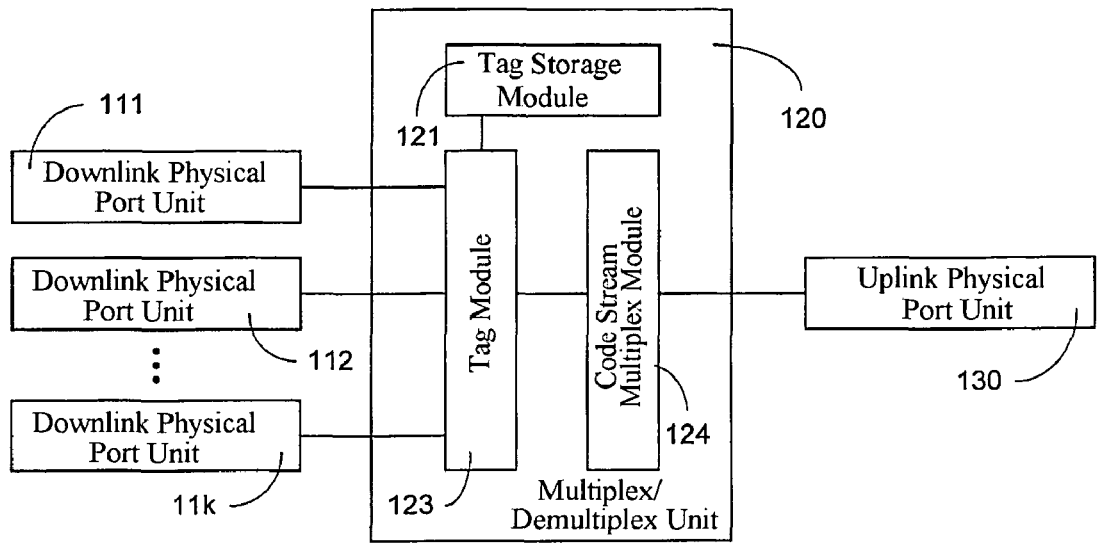
FIG. 6 is a structural diagram of the second embodiment of the access device according to the invention.

FIG. 6 is a structural diagram showing the second embodiment of the access device according to the invention. Multiplex/demultiplex unit 120 includes tag storage module 121, tag module 123 and code stream multiplex module 124. Tag module 123 is connected with tag storage module 121, code stream multiplex module 124 and downlink physical port units, and code stream multiplex module 124 is connected with uplink physical port unit 130.

A tag and a downlink physical port unit having a one-to-one correlation with the tag are stored in tag storage module 121. The tag and the correlation between the tag and the downlink physical port unit may be preset in tag storage module 121.

A downlink physical port unit converts the received low-speed physical layer signal into a low-speed physical layer load and sends the low-speed physical layer load to tag module 123. Tag module 123 searches the tag corresponding to the downlink physical port unit in tag storage module 121, adds the tag to the low-speed physical layer load, and then outputs the low-speed physical layer load to code stream multiplex module 124. Code stream multiplex module 124 converts the low-speed physical layer load with the added tag, into a high-speed physical layer load and output the high-speed physical layer load to uplink physical port unit 130. Uplink physical port unit 130 converts the high-speed physical layer load into a high-speed physical layer signal and then sends the high-speed physical layer signal out of the access device.

Uplink physical port unit 130 converts the received high-speed physical layer signal into a physical layer load and outputs the physical layer load to code stream multiplex module 124. Code stream multiplex module 124 converts the high-speed physical layer load into a low-speed physical layer load and outputs the low-speed physical layer load to tag module 123. Tag module 123 searches the downlink physical port unit corresponding to the tag in the low-speed physical layer load in tag storage module 121, clears the tag from the low-speed physical layer load, and then output low-speed physical layer load to the downlink physical port unit. The downlink physical port unit puts the low-speed physical layer load in a low-speed physical layer signal and sends the low-speed physical layer signal out of the access device.

In this embodiment, tag module 123 may add or clear the tag to/from the physical layer load in the unit of data frame or in a fixed length less than the data frame length. When a fixed length is employed, because a time interval may exist between the data frames output from or input to the same downlink physical port unit, in order to provide an enhanced Quality of Service (QoS), the multiplexing process will be performed when the end of the data frame is reached or the fixed length is not reached. The tag may be added to a given location in the physical layer load and the tag may also be searched and cleared at the location.

Therefore, in this embodiment, the border of the data frame in the physical layer load needs to be identified, so that the range of code streams applying the tag may be determined. But in this embodiment, the field of the data frame in the physical layer load does not need to be resolved. Additionally, because a too large data frame may cause other downlink physical port units in the idle state for a long time, a better QoS can be provided by multiplexing with a fixed length than multiplexing in the unit of the data frame. It should be noted that: for the frame multiplex, frames are multiplexed in turn with each low-speed port. To realize a different QoS, the multiplex order may be changed. For example, for three ports A, B and C, after two frames of A and B are multiplexed in turn, a frame of C will be multiplexed. For the multiplex with the fixed length, the same method may be used, and a considerable improvement may be obtained.

One skilled in the art may understand that, the function of performing a conversion between the high-speed and low-speed physical layer loads of code stream multiplex module 124 may be implemented with reference to that of frame multiplex module 122.

In the case of multiplexing in the unit of the data frame, it is preferable that a VLAN number, which complies with the Ethernet standard, is taken as a tag. Thus, the physical layer load may be processed directly on the gateway side, and the first access system shown in FIG. 2 may be employed. Since the VLAN number is configured on the access device and is irrelevant to the access node, the access device will not learn the tag repeatedly when the MAC address or IP address of the access node changes, so that the stability of the access device may be guaranteed. Moreover, as multilayer VLAN technology becomes more and more mature, the number of VLANs will not be a problem, and a two-layer VLAN may support the access of 4094*4094 nodes.

Except for the case in which the multiplex is performed in the unit of the data frame and the VLAN number is taken as the tag, according to other solutions in this embodiment, the physical layer signal input to or output from uplink physical port 130 carries a physical layer load including an incomplete Ethernet data frame. Therefore, it is applicable for the second access system shown in FIG. 3 or the third access system shown in FIG. 4.

Figure 7:
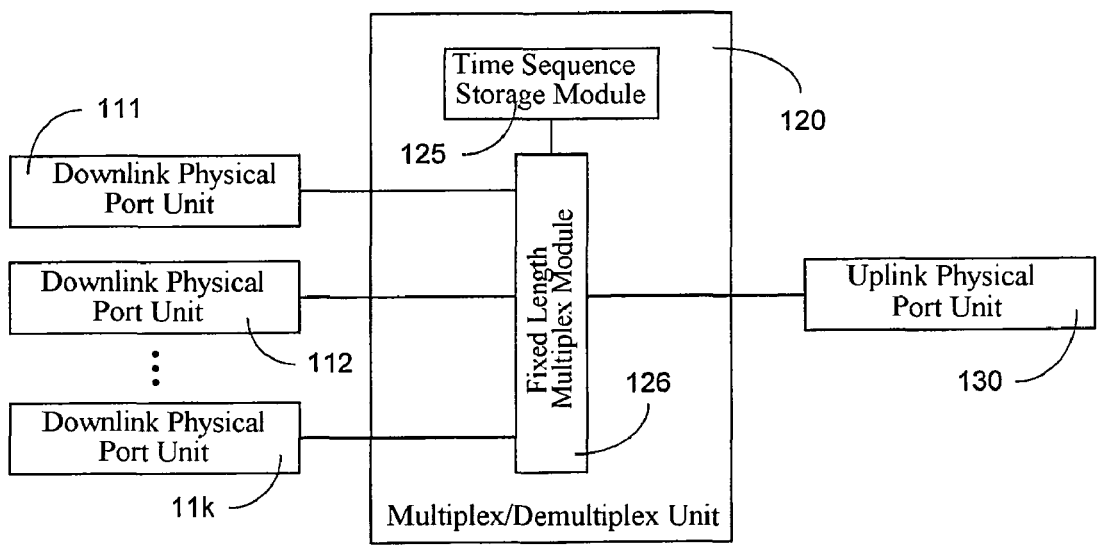
FIG. 7 is a structural diagram of the third embodiment of the access device according to the invention.

FIG. 7 is a structural diagram showing the third embodiment of the access device according to the invention. Multiplex/demultiplex unit 120 includes time sequence storage module 125 and fixed length multiplex module 126. Fixed length multiplex module 126 is connected with downlink physical port units, time sequence storage module 125 and uplink physical port unit 130 respectively.

In this embodiment, each time slot in the time sequence period has the same length. The downlink physical port unit corresponding to each time slot arranged sequentially in the time sequence period is stored in time sequence storage module 125. When the downlink physical port units have the same bandwidth, each physical port unit may correspond to the same number of time slots. However, when downlink physical port units have different bandwidths, each downlink physical port unit may correspond to a time slot, and the number of time slots matches to the bandwidth of the downlink physical port.

A downlink physical port unit converts the received low-speed physical layer signal into a low-speed physical layer load and sends the low-speed physical layer load to fixed length multiplex module 126. Fixed length multiplex module 126 writes each input low-speed physical layer load to a buffer region corresponding to the downlink physical port unit, and in the unit of the time slot in the time sequence period, fixed length multiplex module 126 sequentially outputs a physical layer load with a certain length from the buffer region of the downlink physical port unit corresponding to the time slot with a high-speed clock. For a downlink physical port unit which has no network traffic currently, the corresponding time slot will be filled with an idle signal of the Ethernet standard or an idle signal agreed on by the two communicating parties. Thus, according to the cycle order of the time sequence period, fixed length multiplex module 126 multiplexes the low-speed physical layer loads into the high-speed physical layer load on one channel including the code stream segment corresponding to each downlink physical port unit. The multiplexed high-speed physical layer load is output to uplink physical port unit 130. Uplink physical port unit 130 converts the high-speed physical layer load into a high-speed physical layer signal and then sends the high-speed physical layer signal out of the access device.

Uplink physical port unit 130 converts the received high-speed physical layer signal into a physical layer load and outputs the physical layer load to fixed length multiplex module 126. Fixed length multiplex module 126 writes the high-speed physical layer load into a high-speed buffer region and in the unit of the time slot in the time sequence period, fixed length multiplex module 126 sequentially outputs a physical layer load of with a certain length from the high-speed buffer region to the downlink physical port unit corresponding to the time slot at a low-speed clock. Thus, according to the cycle order of the time sequence period, fixed length multiplex module 126 demultiplexes the high-speed physical layer load on one channel into multiple low-speed physical layer loads. The downlink physical port unit puts the received low-speed physical layer loads in a low-speed physical layer signal and sends the low-speed physical layer signal out of the access device.

Figure 8:
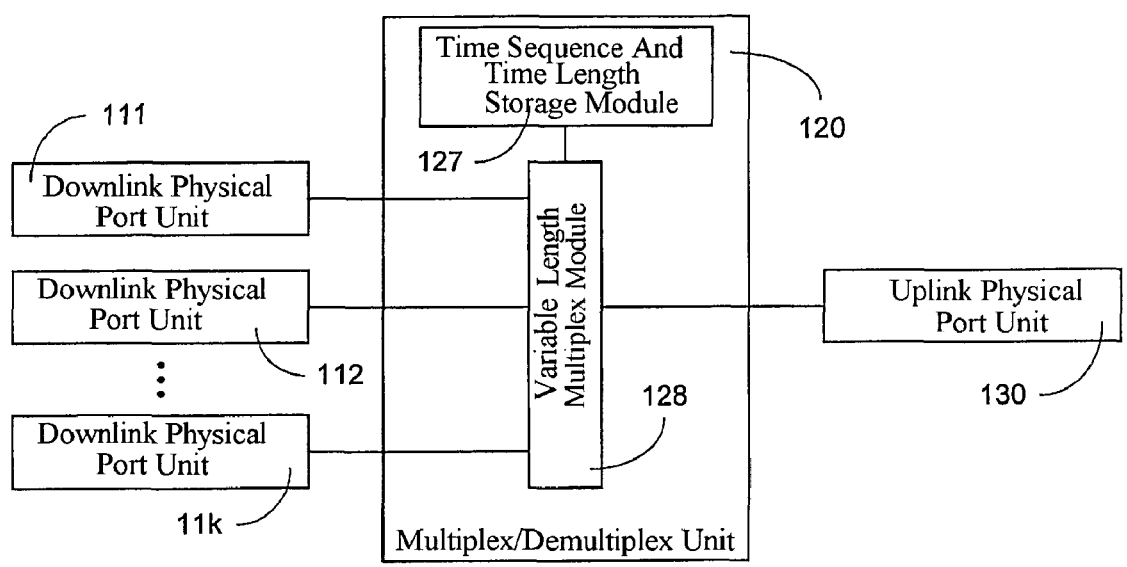
FIG. 8 is a structural diagram of the fourth embodiment of the access device according to the invention.

FIG. 8 is a structural diagram showing the fourth embodiment of the access device according to the invention. Multiplex/demultiplex unit 120 includes time sequence and time length storage module 127 and variable length multiplex module 128. Variable length multiplex module 128 is connected with downlink physical port units, time sequence and time length storage module 127 and uplink physical port unit 130.

In the access system, the node users may employ different access rates. This embodiment is applicable for the case in which downlink physical port units have different bandwidths. The difference between this embodiment and the third embodiment lies in that the length of the time slot in the time sequence period is introduced. In addition to the downlink physical port unit corresponding to the time slot arranged sequentially in the time sequence period, the length of the time slot is further stored in time sequence and time length module 127. The time slot length matches the bandwidth of the downlink physical port unit.

A downlink physical port unit converts the received low-speed physical layer signal into a low-speed physical layer load and sends the low-speed physical layer load to variable length multiplex module 128. Variable length multiplex module 128 writes each input low-speed physical layer load to a buffer region corresponding to the downlink physical port unit, and outputs a physical layer load with a certain length from the buffer region of the downlink physical port unit corresponding to each time slot at a high-speed clock, according to the time slot order in the time sequence period. The length of the physical layer load corresponds to the length of the time slot. For a downlink physical port unit having no network traffic currently, the time slot will be filled with an idle signal of the Ethernet standard or an idle signal agreed on by the two communicating parties. Thus, according to the cycle order of the time sequence period, variable length multiplex module 128 multiplexes the low-speed physical layer loads into the high-speed physical layer load on one channel including code stream segments with different lengths corresponding to different downlink physical port units. The multiplexed high-speed physical layer load is output to uplink physical port unit 130. Uplink physical port unit 130 converts the high-speed physical layer load into a high-speed physical layer signal and then sends the high-speed physical layer signal out of the access device.

Uplink physical port unit 130 converts the received high-speed physical layer signal into a physical layer load and outputs the physical layer load to variable length multiplex module 128. Variable length multiplex module 128 writes the high-speed physical layer load into a high-speed buffer, and outputs a physical layer load with a certain length from the high-speed buffer region to the downlink physical port unit corresponding to the time slot at a low-speed clock, according to the time slot order in the time sequence period. The length of the output physical layer load corresponds to the length of the time slot. Thus, according to the cycle order of the time sequence period, variable length multiplex module 128 demultiplexes the high-speed physical layer load on one channel into multiple low-speed physical layer loads. The downlink physical port unit puts the received low-speed physical layer loads in a low-speed physical layer signal and sends the low-speed physical layer signal out of the access device.

In fact, the time slot in the third embodiment and the fourth embodiment may also be regarded as a measurement on the length of the physical layer load. For example, it may be the number of bytes in the physical layer load.

In third embodiment and the fourth embodiment, multiplex/demultiplex unit 120 does not need to know the content of the physical layer load, and does not need to identify nor resolve the data frame therein. Additionally, different from the first embodiment and the second embodiment in which all the downlink connections share the uplink bandwidth, in the third embodiment and the fourth embodiment, the bandwidth part in the uplink bandwidth allocated to each downlink connection is reserved strictly, so that QoS performance is guaranteed on the physical layer. But in these two embodiments, high requirements are laid on the physical layer transmission from uplink physical port 130 to the gateway equipment side, in order to avoid the data retransmission due to a malposition of a code stream.

In the third embodiment and the fourth embodiment, the physical layer signal input to or output from uplink physical port 130 carries the physical layer signal including an incomplete Ethernet data frame. Therefore, it is applicable for the second access system shown in FIG. 3 or the third access system shown in FIG. 4.

In practice, each physical port on a physical layer (PHY) chip usually has the same bandwidth. It seldom provides more than 8 physical ports on a PHY chip, even if the bandwidth is less than 100 M after multiplexed and the long distance transmission in the unit of 100 M still cannot meet the low cost requirement of the broadband access. At this point, the access device may employ a cascade multiplex structure, and an example of the logical structure is shown in FIG. 9.

Figure 9:
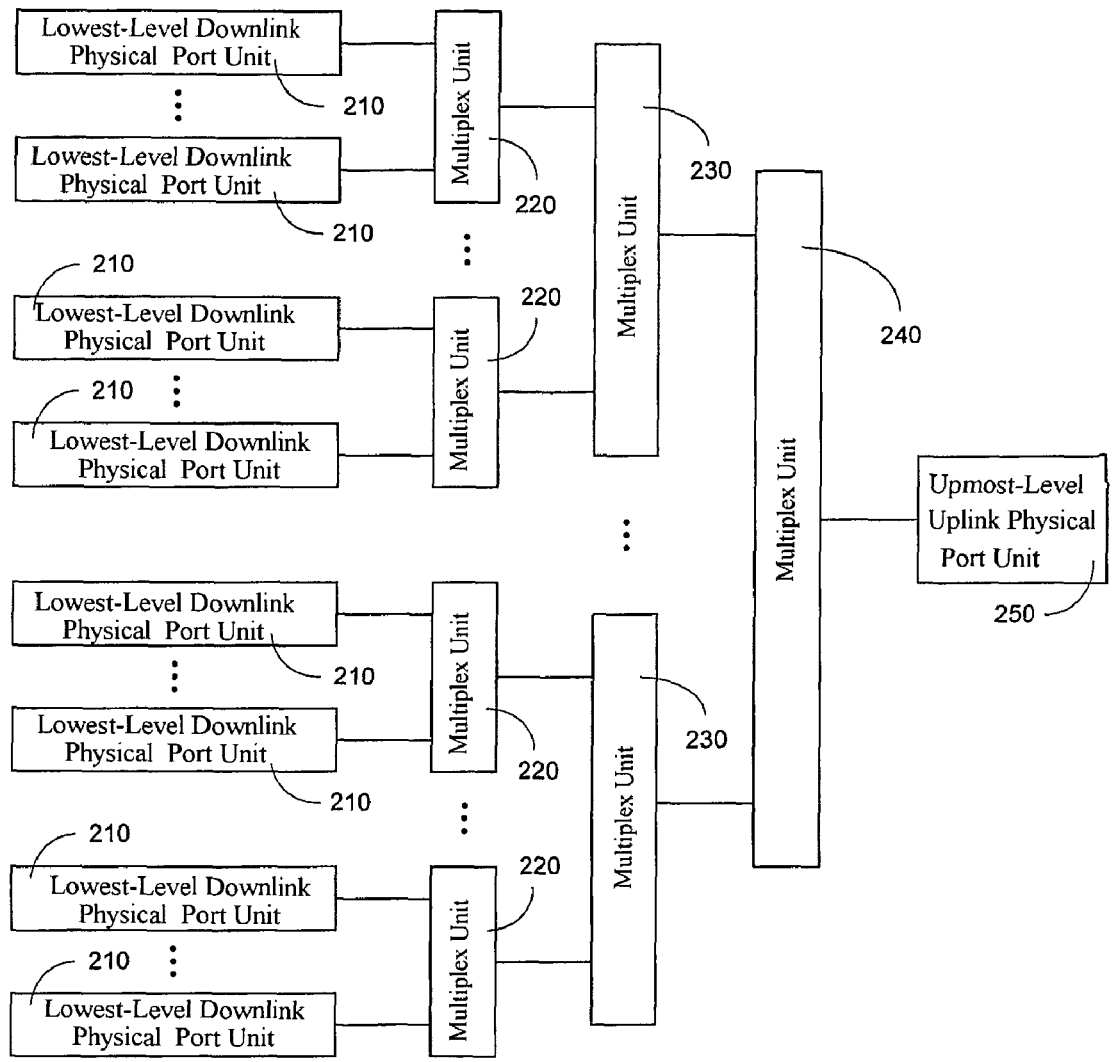
FIG. 9 is a logical structure diagram of the access device employing the cascade multiplex according to an embodiment of the invention.

In FIG. 9, the multiplex unit is divided into a plurality of multiplex levels according to different uplink and downlink bandwidths. The downlink interface of lowest-level multiplex unit 220 is connected with lowest-level downlink physical port unit 210, and the uplink interface of lowest-level multiplex unit 220 is connected with intermediate-level multiplex unit 230. The uplink interface of intermediate-level multiplex unit 230 is connected with the downlink interface of upmost-level multiplex unit 240 and the uplink interface of upmost-level multiplex unit 240 is connected with upmost-level uplink physical port unit 250.

Lowest-level downlink physical port unit 210 converts the low-speed physical layer signal of the access node into a low-speed physical layer load, and each of multiplex units 220, 230 and 240 converts the low-speed physical layer load into a high-speed physical layer load level by level, and then upmost-level uplink physical port unit 250 outputs a physical layer signal carrying the high-speed physical layer load. Upmost-level uplink physical port unit 250 resolves the high-speed physical layer load from the high-speed physical layer signal received. Each of multiplex units 240, 230 and 220 demultiplexes the high-speed physical layer load into a low-speed physical layer load corresponding to lowest-level downlink physical port unit 210 level by level and outputs the low-speed physical layer load. Lowest-level downlink physical port unit 210 converts the low-speed physical layer load received from multiplex unit 220 into a low-speed physical layer signal and then outputs the low-speed physical layer signal out of the access device. Lowest-level downlink physical port units 210 connected with the same multiplex unit 220 or different multiplex units 220 may have different bandwidths.

The access device of the invention supports the cascade multiplex of two or more levels of multiplex units. According to the different multiplex technologies employed, each multiplex unit may have different realization methods. The fifth embodiment to the ninth embodiment of the access device have the same cascade logical structure, and the difference lies in that the realization method of the multiplex unit is different. For simplification, the fifth embodiment to the ninth embodiment will now be illustrated with reference to the multiplex unit. Each multiplex unit includes at least two downlink interfaces and an uplink interface. The downlink interface is adapted to input/output at least two physical layer loads, and the uplink interface is adapted to input/output the physical layer load after the multiple physical layer loads of the downlink interface are multiplexed or before the physical layer loads are demultiplexed.

The multiplex unit in the fifth embodiment and the seventh embodiment performs the multiplexing according to the traffic reaching the downlink interface, and performs demultiplexing via the tag in the physical layer load corresponding to the downlink interface. In the eighth embodiment and the ninth embodiment, the multiplexing and demultiplexing are performed periodically according to a time sequence period. The time sequence period is divided into time slots corresponding to the downlink physical interface and each time slot is dedicated to the corresponding downlink interface. The physical layer will be filled with an idle signal even if no network traffic exists in the downlink interface, and will not be used for transmitting the traffic of other downlink interfaces. The idle signal may be an idle signal of the Ethernet standard or an idle signal agreed on by the two communicating parties.

Figure 10:
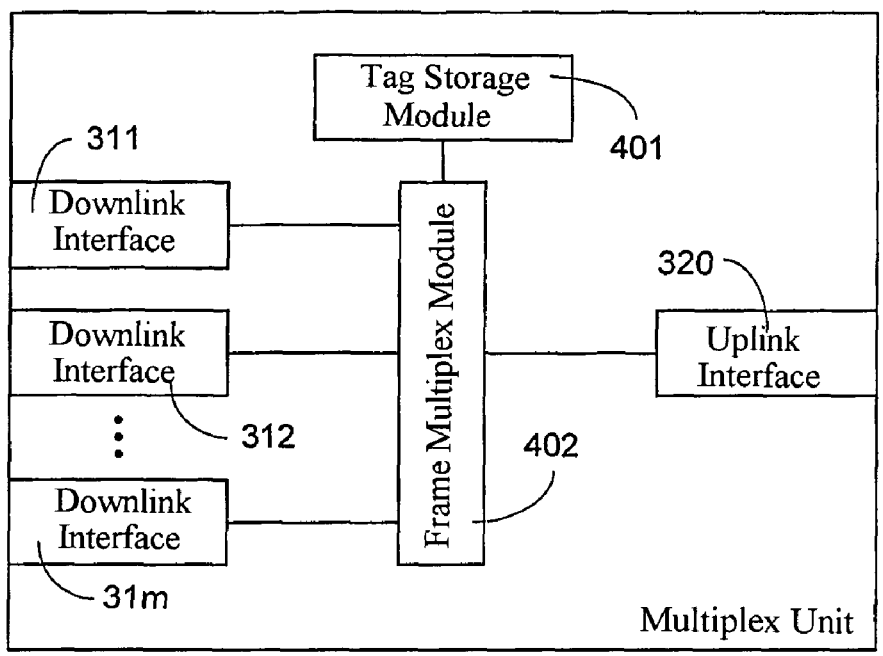
FIG. 10 is a structural diagram showing the multiplex unit of the fifth embodiment of the access device according to the invention.

The structure of the multiplex unit in the fifth embodiment of the access device is shown in FIG. 10. Downlink interfaces 311, 312 to 31$m$ are connected with frame multiplex module 402, and frame multiplex module 402 is further connected with tag storage module 401 and uplink interface 320.

Similar to the first embodiment of the access device, in this embodiment, the multiplex unit takes a field in the data frame, which has a one-to-one correlation with the access node, as a tag. Because each access node is connected with the downlink interface of the lowest-level multiplex unit via a lowest-level downlink physical port unit, for multiplex units of different levels, a tag in a physical layer load transmitted via a downlink interface is different from that in a physical layer load transmitted via other downlink interface. The tag may be a field in the data frame, for example, the MAC address, IP address of the access node and so on.

In this embodiment, multiplex units of different levels may employ the structure shown in FIG. 10. For the multiple physical layer loads input from the downlink interfaces, frame multiplex module 402 checks whether the tag in the data frame and the corresponding downlink interface have been saved in tag storage module 401. If the tag and the corresponding downlink interface have not been saved or have changed, tag storage module 401 will be updated, so that a correlation between current tag and the downlink interface may be maintained in tag storage module 401. Then, it will be converted into a high-speed physical layer load and output from the multiplex unit via uplink interface 320.

For physical layer load on one channel received from uplink interface 320, frame multiplex module 402 searches a downlink interface corresponding to the tag in the data frame in tag storage module 401, converts the physical layer load into a low-speed physical layer load, and then output the low-speed physical layer load from the multiplex unit via the downlink interface corresponding to the tag.

Frame multiplex module 402 may be realized with reference to frame multiplex module 122 in the first embodiment of the access device. In this embodiment, by performing the multiplexing level by level, the physical layer loads carried in the physical layer signal input to/output from the access device comply with the Ethernet standard, and the access device may be directly connected with a standard gateway equipment and be applicable for the first Ethernet access system shown in FIG. 2.

Figure 11:
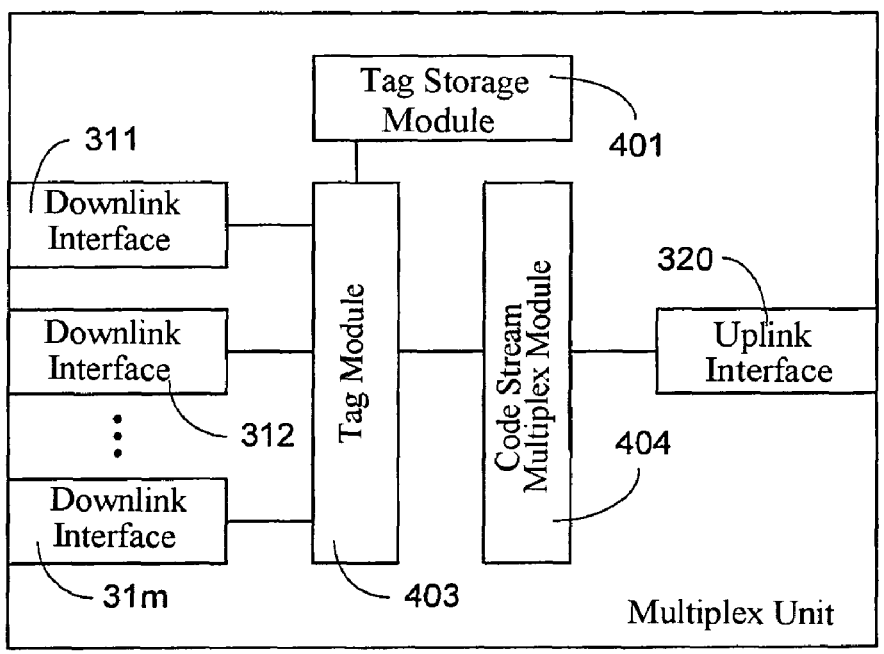
FIG. 11 is a structural diagram showing the lowest-level multiplex unit of the sixth embodiment of the access device according to the invention.
Figure 12:
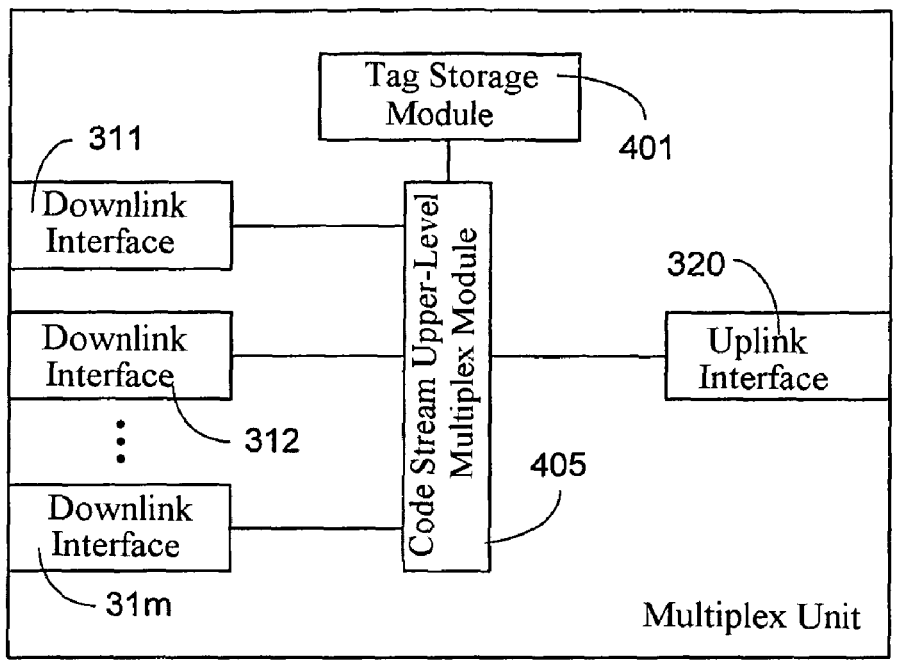
FIG. 12 is a structural diagram showing the upper-level multiplex unit of the sixth embodiment of the access device according to the invention.

In sixth embodiment of the access device, the structure of the lowest-level multiplex unit is different from that of the multiplex unit of other level. The structure of the lowest-level multiplex unit is as shown in FIG. 11. Tag module 403 is connected with downlink interfaces 311, 312 to 31m, tag storage module 401 and code stream multiplex module 404. Code stream multiplex module 404 is connected with uplink interface 320. The structure of the multiplex unit of other level is shown in FIG. 12. Code stream upper-level multiplex module 405 is connected with downlink interfaces 311, 312 to 31m, tag storage module 401 and uplink interface 320. In this embodiment, a tag having a one-to-one correlation with the lowest-level physical port unit of the access device is employed.

Referring to FIG. 11, tag storage module 401 of the lowest-level multiplex unit stores a tag corresponding to the lowest-level physical port unit connected with the lowest-level multiplex unit and a mapping relation between the tag and the downlink interface connected with the corresponding lowest-level physical port unit. The tag and the correlation may be preset in tag storage module 401.

In the lowest-level multiplex unit, for a physical layer load received from a downlink interface, tag module 403 searches the tag corresponding to the downlink interface, adds the tag to the physical layer load received, and then outputs the physical layer load to code stream multiplex module 404. Code stream multiplex module 404 performs a downlink-to-uplink transmission rate conversion on the physical layer load to which the tag is added, and outputs the physical layer load after the rate conversion from uplink interface 320 to the upper-level multiplex unit. For the physical layer load received from uplink interface 320, code stream multiplex module 404 performs an uplink-to-downlink transmission rate conversion on the physical layer load received, and outputs the physical layer load after the rate conversion to tag module 403. Tag module 403 searches the downlink interface corresponding to the tag in the physical layer load after the rate conversion, clears the tag in the physical layer load, and then outputs the physical layer load from the multiplex unit via the downlink interface.

Referring to FIG. 12, tag storage module 401 of other level stores a tag corresponding to the lowest-level physical port unit connected with the multiplex unit and a mapping relation between the tag and the downlink interface connected with the lowest-level physical port unit. It can be seen that, the higher the level of the multiplex unit is, the more the tags corresponding to the downlink interfaces will be. The tag and the correlation may be preset in tag storage module 401.

In other level multiplex units, for a physical layer load received from a downlink interface, a tag has been added to the physical layer load by the lowest-level multiplex unit, and code stream upper-level multiplex module 405 performs a downlink-to-uplink transmission rate conversion on the physical layer load and outputs the physical layer load after the rate conversion from the multiplex unit via uplink interface 320. After the physical layer load is received from uplink interface 320, code stream upper-level multiplex module 405 searches the downlink interface corresponding to the tag therein in tag storage module 401, performs an uplink-to-downlink transmission rate conversion on the physical layer load received, and outputs the physical layer load after the rate conversion from the multiplex unit via the downlink interface.

In this embodiment, the tag added to the physical layer load by the lowest-level multiplex unit will pass through each upper-level multiplex unit and then the tag will be sent out from the access device. The upper-level multiplex unit uses the tag, which is included in the physical layer load received by the access device from the gateway equipment side, to determine which downlink interface the physical layer loads demultiplexed will be output from, and the tag is cleared only before the physical layer load is output from the lowest-level multiplex unit.

In this embodiment, tag module 403 of the lowest-level multiplex unit may add or clear the tag to/from the physical layer load in the unit of data frame or in a fixed length less than the data frame length, but all the lowest-level multiplex units must employ the same multiplex mode. In the case that a fixed length is employed, to provide a good QoS, the multiplexing process will be performed when the end of the data frame is reached or even if the fixed length is not reached. The tag may be added to a given location in the physical layer load. Similarly, the tag may also be searched and cleared at the location.

Therefore, in this embodiment, tag module 403 of the lowest-level multiplex unit needs to identify the border of the data frame in the physical layer load, so that the range of code streams to which the tag is applied may be determined. But in this embodiment, the field of the data frame in the physical layer load does not need to be resolved. Additionally, because a too large data frame may cause other downlink physical port units in the idle state for a long time, a better QoS performance can be obtained by performing the multiplexing with a fixed length than performing the multiplexing in the unit of the data frame.

In this embodiment, code stream multiplex module 404 of the lowest-level multiplex unit and code stream upper-level multiplex module 405 of other level may be realized with reference to the realization of frame multiplex module 122 in the first embodiment of the access multiplex device.

In the case of performing the multiplexing in the unit of data frame, it is recommended that a VLAN number in accordance with the Ethernet standard is taken as a tag. Thus, the physical layer load may be processed directly on the gateway side, and the first access system shown in FIG. 2 may be employed. The VLAN number is configured by the service provider on the access device, and the access device cannot perceive the adding and removing of the VLAN number. Different from the MAC address and the IP address, the VLAN number cannot be modified by the access node, and the access device will not learn the tag repeatedly, thus the stability may be guaranteed. Moreover, as the multilayer VLAN technology becomes more and more mature, the number of VLANs will not be a problem since a two-layer VLAN may support the access of 4094*4094 nodes.

Except for the case in which the multiplex is performed in the unit of data frame and the VLAN number is used as the tag, in other solutions of this embodiment, a non-standard Ethernet physical layer load is carried in the physical layer signal input to or output from the upmost-level uplink physical port. The solutions may be applicable for the second access system shown in FIG. 3 or the third access system shown in FIG. 4.

Figure 13:
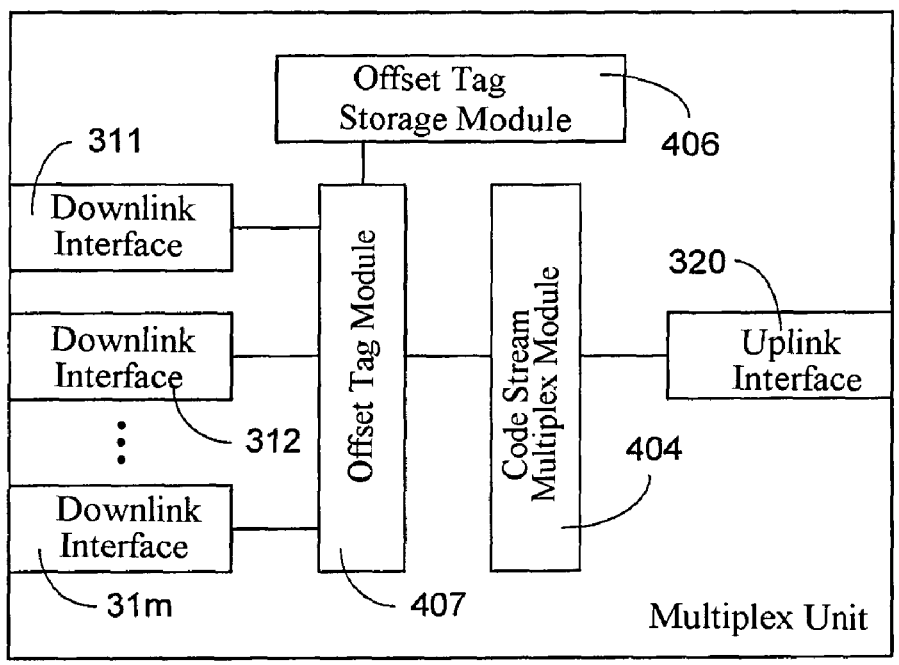
FIG. 13 is a structural diagram showing the multiplex unit of the seventh embodiment of the access device according to the invention.

FIG. 13 shows the structure of the multiplex unit in the seventh embodiment of the access device. Offset tag module 407 is connected with downlink interfaces 311, 312 to 31m, offset tag storage module 406 and code stream multiplex module 404. Code stream multiplex module 404 is connected with uplink interface 320. In this embodiment, the tag employed includes an offset tag of a multiplex unit in each level. The offset tags of the same level have the same location and the same bit length in the physical layer load and are used by the multiplex unit, and have a one-to-one correlation with the downlink interface of the multiplex unit. The offset tags of units of different levels may have different locations and different bit length.

Offset tag storage module 406 of a multiplex unit stores an offset tag of the multiplex unit and the correlation between the offset tag and the downlink interface of the multiplex unit.

For a physical layer load received from a downlink interface in a level of multiplex unit, offset tag module 407 searches the offset tag corresponding to the downlink interface in offset tag storage module 406, adds the offset tag at the location of the offset tag in the physical layer load received, and then outputs the physical layer load to code stream multiplex module 404. Code stream multiplex module 404 performs a downlink-to-uplink transmission rate conversion on the physical layer load with the offset tag added, and outputs the physical layer load after the rate conversion from the multiplex unit via uplink interface 320. For the physical layer load received from uplink interface 320, code stream multiplex module 404 performs an uplink-to-downlink transmission rate conversion on the physical layer load received, and outputs the physical layer load after the rate conversion to offset tag module 407. Offset tag module 407 extracts the offset tag at the location of the offset tag in the physical layer load after conversion, searches the downlink interface corresponding to the offset tag in offset tag storage module 406, clears the offset tag from the physical layer load and then outputs the physical layer load from the multiplex unit via the downlink interface.

In this embodiment, the offset tag is added to the uplink physical layer load level by level during the stepwise multiplexing process. Because each multiplex unit has a unique offset tag, the tag consisted of offset tags in different levels has a one-to-one correlation with the lowest-level downlink physical port unit. The offset tags are cleared level by level during the stepwise demultiplexing process for the downlink physical layer load, and all the offset tags will be cleared before the physical layer load is output to the downlink interface of the lowest-level multiplex unit.

Similar to the sixth embodiment, in this embodiment, the offset tag may be add to or cleared from the physical layer load in the unit of a data frame or in a fixed length less than the data frame length, but all the multiplex units employ the same multiplex mode. Therefore, in this embodiment, offset tag module 406 in a multiplex unit needs to identify the border of the data frame in the physical layer load, so that the range of code streams to which the tag is applied may be determined.

In this embodiment, code stream multiplex module 404 in the multiplex unit may be realized with reference to the realization of frame multiplex module 122 in the first embodiment of the access multiplex device.

In the case of performing the multiplex in the unit of data frame, it is recommended that offset tags for different levels are set in such a mode that a combination of all offset tags for different levels will form a VLAN number in accordance with the Ethernet standard. Optionally, the multilayer VLAN technology may be employed and an offset tag of a level uses a layer of VLAN. Thus, the physical layer load may be processed directly on the gateway side. And the first access system as shown in FIG. 2 will be employed in this embodiment.

Except for the case in which a combination of offset tags for different levels forms a VLAN number, other solutions of this embodiment are applicable for the second access system shown in FIG. 3 or the third access system shown in FIG. 4.

Figure 14:
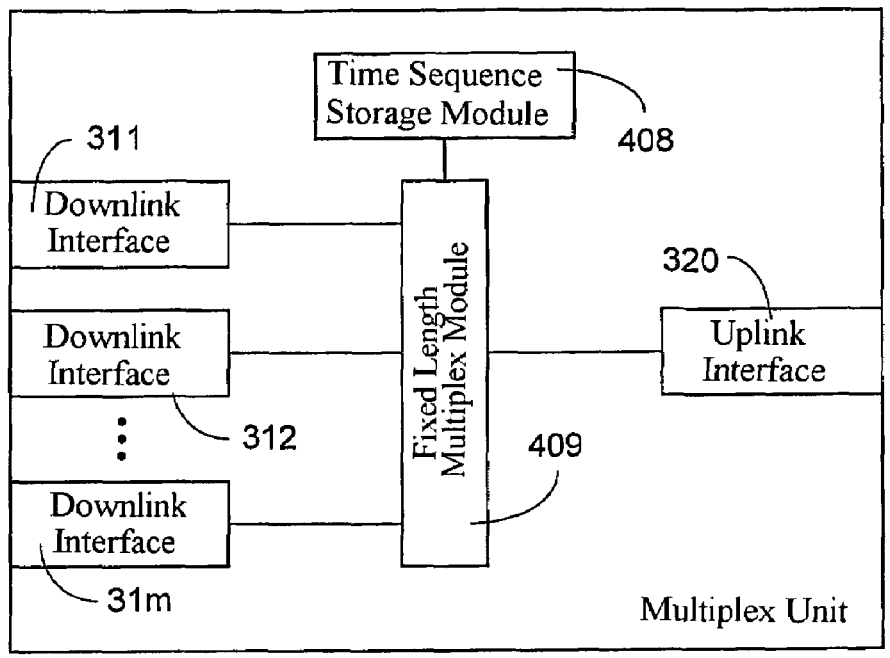
FIG. 14 is a structural diagram showing the multiplex unit of the eighth embodiment of the access device according to the invention.

The structure of the multiplex unit in the eighth embodiment of the access device is as shown in FIG. 14. Fixed length multiplex module 409 is connected with downlink interfaces 311, 312 to 31*m*, time sequence storage module 408 and uplink interface 320, respectively.

In this embodiment, each time slot in the time sequence period has the same length. Time sequence storage module 408 stores the downlink interfaces corresponding to time slots arranged sequentially in the time sequence period. If the downlink interfaces have the same bandwidth, downlink interfaces may correspond to the same number of time slots. If downlink interfaces have different bandwidths, each downlink interface may correspond to the time slots with the number corresponding to the bandwidth of the downlink interface.

In each multiplex unit, fixed length multiplex module 409 writes the physical layer load received from a downlink interface to a buffer region of the downlink interface, and sequentially outputs a physical layer load of a certain length from the buffer region in the downlink interface corresponding to a time slot in a clock determined by the uplink interface bandwidth and in the unit of the time slot in the time sequence period. For a downlink interface having no network traffic, the corresponding time slot will be filled with an idle signal of the Ethernet standard or an idle signal agreed on by the two communicating parties. Thus, according to the cycle order of the time sequence period, fixed length multiplex module 409 multiplexes multiple physical layer loads of the downlink interface into physical layer load on one channel. A multiplexed physical layer load of a level includes a code stream segment corresponding to a downlink interface of current multiplex unit. Fixed length multiplex module 409 outputs the multiplexed physical layer load of the level from the multiplex unit via uplink interface 320.

For a physical layer load received from uplink interface 320, fixed length multiplex module 409 writes the physical layer load to a buffer region of uplink interface 320 and sequentially outputs the physical layer load of a certain length to a downlink interface corresponding to a time slot from the buffer region of uplink interface 320 in a clock determined by the downlink interface bandwidth and in the unit of the time slot in the time sequence period. Thus, according to the cycle order of the time sequence period, fixed length multiplex module 409 demultiplexes physical layer load on one channel of uplink interface 320 into multiple physical layer loads of the downlink interface and outputs the multiple physical layer loads from the multiplex unit via corresponding downlink interfaces.

Thus, low-speed physical layer loads transmitted in uplink from the downlink interface in the lowest-level multiplex unit form the high-speed physical layer load on one channel after being multiplexed by the multiplex unit level by level. The high-speed physical layer load generated during the time sequence period of the upmost-level multiplex unit includes code stream segments corresponding to the downlink interface of the lowest-level multiplex unit. The code stream segments have the same length, and the order of the code stream segments is determined by the order of the time slots corresponding to the downlink interface in the time sequence period of the multiplex unit in each level. The high-speed physical layer load transmitted in downlink from the uplink interface of the upmost-level multiplex unit includes code stream segments corresponding to the downlink interfaces of the lowest-level multiplex unit and arranged in the same order. After the high-speed physical layer load is demultiplexed by multiplex units of different level subsequently, the high-speed physical layer load is output from the downlink interface of the lowest-level multiplex unit.

Figure 15:
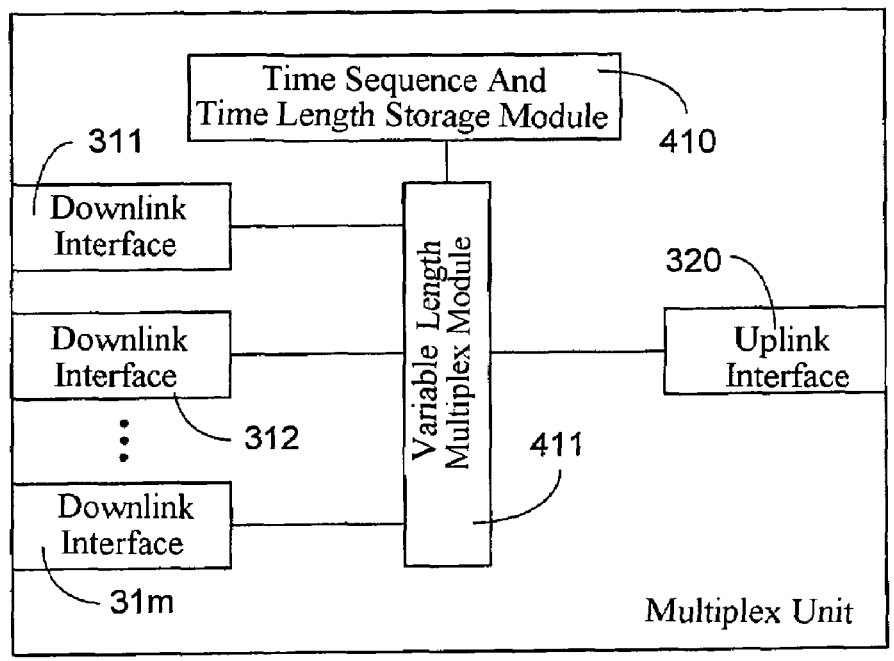
FIG. 15 is a structural diagram showing the multiplex unit of the ninth embodiment of the access device according to the invention.

The structure of the multiplex unit in the ninth embodiment of the access device is as shown in FIG. 15. Variable length multiplex module 411 is connected with downlink interfaces 311, 312 to 31*m*, time sequence and time length storage module 410 and uplink interface 320.

In the access system, the node users may employ different access rates. This embodiment is applicable for the case that different lowest-level downlink physical port units may have different bandwidths. The difference between this embodiment and the eighth embodiment lies in that time slots in the time sequence period may have different lengths. In addition to the downlink interface corresponding to time slots arranged sequentially in the time sequence period, the length of the time slot is further stored in time sequence and time length module 410, and the time slot length matches the bandwidth of the downlink interface.

Variable length multiplex module 411 writes the multiple physical layer loads received from the downlink interface to a buffer region in the downlink interface, and outputs a physical layer load of a certain length from the buffer region of the downlink interface corresponding to a time slot in a clock determined by the uplink interface bandwidth according to the time slot order in the time sequence period. The length of the physical layer load corresponds to the length of the time slot. For a downlink interface having no network traffic, the time slot will be filled with an idle signal of the Ethernet standard or an idle signal agreed on by the two communicating parties in the physical layer. Thus, according to the cycle order of the time sequence period, variable length multiplex module 411 multiplexes the multiple physical layer loads of the downlink interface into physical layer load on one channel of the uplink interface. The multiplexed physical layer load includes code stream segments of different lengths corresponding to downlink interfaces. Variable length multiplex module 411 outputs the multiplexed physical layer load out of the multiplex unit via uplink interface 320.

For the physical layer load received from uplink interface 320, variable length multiplex module 411 writes the physical layer load to the buffer region of the uplink interface, and outputs a physical layer load of a certain length from the buffer region of the uplink interface to the downlink interface corresponding to the time slot in a clock determined by the downlink interface bandwidth, according to the time slot order in the time sequence period. The length of the physical layer load corresponds to the length of the time slot. Thus, according to the cycle order of the time sequence period, variable length multiplex module 411 demultiplexes the physical layer load on one channel of the uplink interface into multiple physical layer loads of the downlink interface and outputs the multiple physical layer loads from the multiplex unit via corresponding downlink interfaces.

In fact, the time slot in the eighth embodiment and the ninth embodiment may be regarded as the length of the physical layer load processed during multiplexing and demultiplexing. The time slot may be the number of bytes in the physical layer load.

In the eighth embodiment and the ninth embodiment, the multiplex unit does not need to identify nor resolve the data frame in the physical layer load. Additionally, similar to the third embodiment and the fourth embodiment, the bandwidth in the uplink bandwidth allocated to each downlink connection is reserved strictly. Hence, the QoS performance may be guaranteed in the physical layer. The eighth embodiment and the ninth embodiment are applicable for the second access system shown in FIG. 3 or the third access system shown in FIG. 4.

Figure 16:
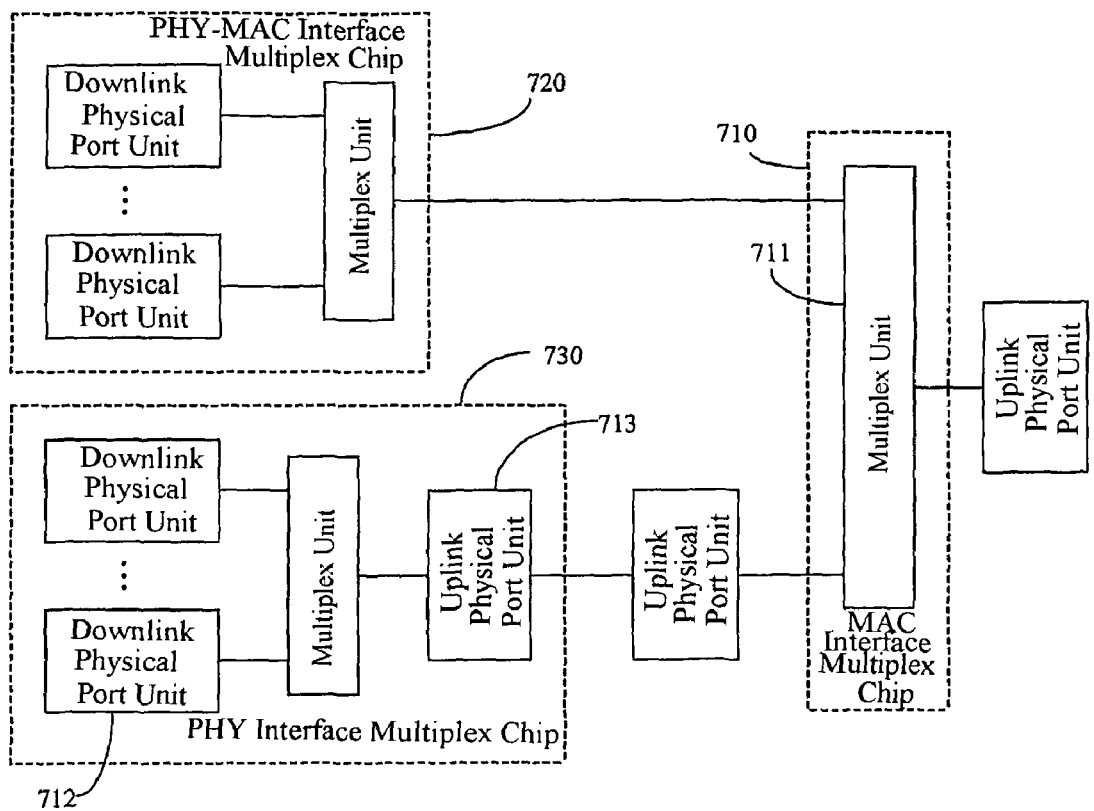
FIG. 16 is a schematic diagram showing the logical structure and connection mode of the multiplex chip according to an embodiment of the invention.

As described above, the cascade multiplex is mainly direct to the case in which a multiplex chip is employed. Referring to FIG. 16, the multiplex chip usually includes the following three types. The first is MAC interface multiplex chip 710, i.e., multiplex unit 711 encapsulated in a chip, whose uplink and downlink ports are adapted to input/output a physical layer load. The second is PHY-MAC interface multiplex chip 720, i.e., multiplex unit 711 and downlink physical port unit 712 connected with each downlink interface of the multiplex unit are encapsulated in a chip, whose uplink port inputs/outputs a physical layer load and whose downlink port inputs/outputs a physical layer signal. The third is PHY interface multiplex chip 730, i.e., multiplex unit 711, downlink physical port unit 712 connected with downlink interfaces of the multiplex unit and uplink physical port unit 713 connected with uplink interfaces of the multiplex unit are encapsulated in a chip, whose uplink and downlink ports both input/output a physical layer signal.

When the multiplex unit in the fifth embodiment to the ninth embodiment of the access device employs an MAC interface multiplex chip, the uplink port of the lower-level MAC interface multiplex chip may be directly connected with the downlink interface of an adjacent upper-level MAC interface multiplex chip. When a PHY interface multiplex chip is employed, the uplink port of the lower-level PHY interface multiplex chip may be directly connected with the downlink interface of an adjacent upper-level PHY interface multiplex chip. When a PHY-MAC interface multiplex chip is employed, the uplink port of the lower-level PHY-MAC interface multiplex chip needs to be connected with the downlink interface of an adjacent upper-level PHY-MAC interface multiplex chip via an uplink physical port unit matching the transmission rate of the uplink port.

Optionally, the three multiplex chips may be used in combination. At this point, an uplink physical port unit or a downlink physical port unit may be connected between the upper-level multiplex chip and the lower-level multiplex chip for converting signals.

The third Ethernet access system shown in FIG. 4 employs a conventional gateway equipment to connect with an exterior network, and the access conversion device acts as an interface between the access device and the gateway equipment. The access conversion device of the invention includes at least one access-side physical port unit for connecting the access device, and further includes a gateway-side physical port unit for connecting the gateway equipment. The access conversion device also needs to employ a multiplex technology in accordance with the access device.

Figure 17:
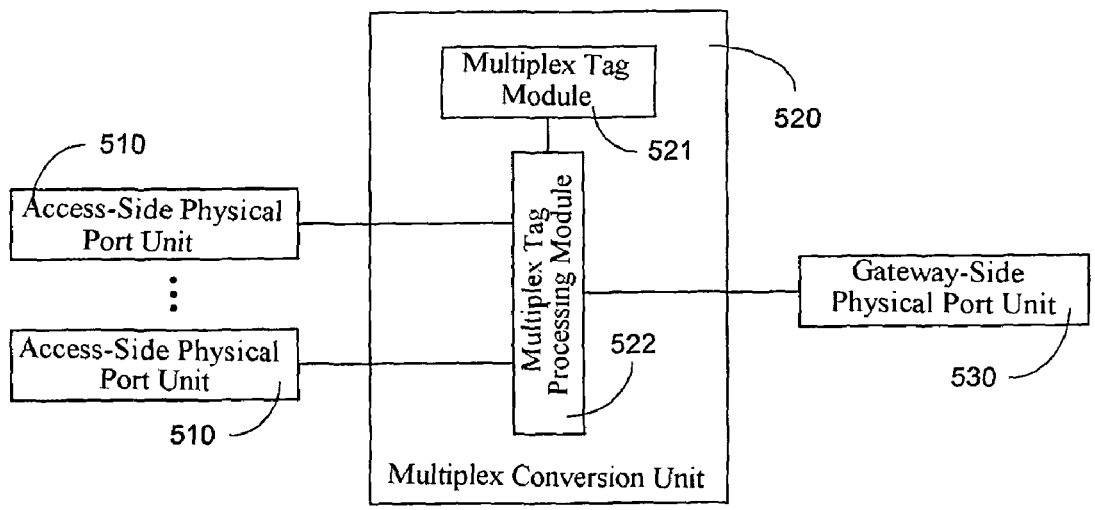
FIG. 17 is a structural diagram of the first embodiment of the access conversion device according to the invention.
Figure 18:
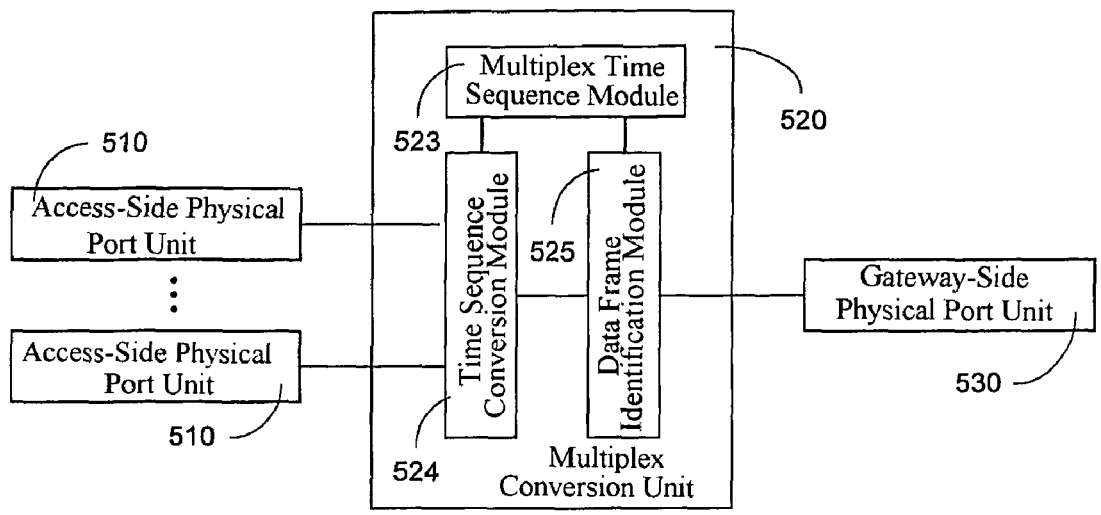
FIG. 18 is a structural diagram of the second embodiment of the access conversion device according to the invention.
Figure 19:
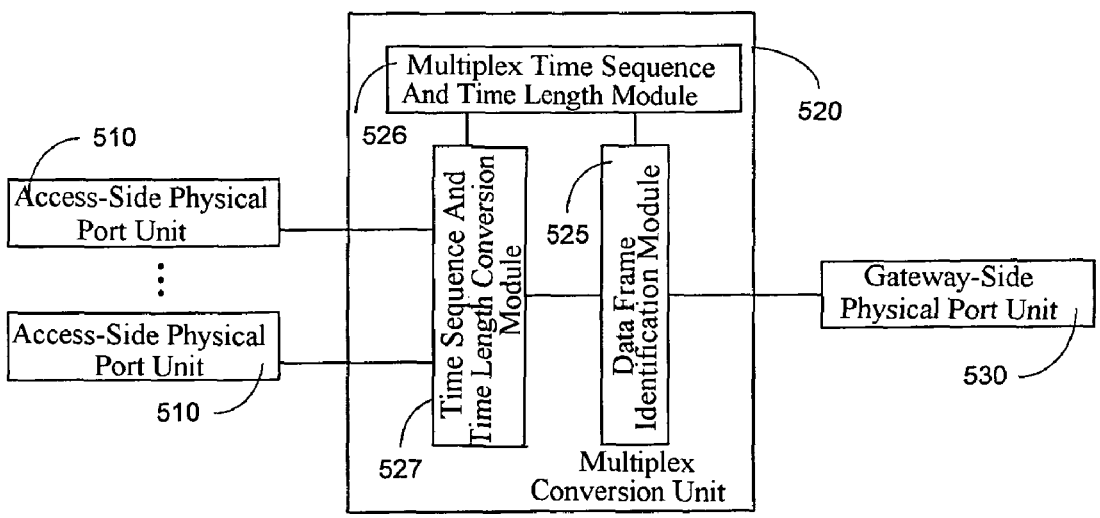
FIG. 19 is a structural diagram of the third embodiment of the access conversion device according to the invention.

FIG. 17 to FIG. 19 are structural diagrams showing the first embodiment to the third embodiment of the access conversion device according to the invention, respectively. Multiplex conversion unit 520 is connected with access-side physical port unit 510 and gateway-side physical port unit 530 respectively (It should be noted that the gateway side includes a device near the gateway, but the device is not required to connect with the gateway directly; one skilled in the art may appreciate that a conventional Ethernet switch, or even a Layer-2 Ethernet Ring Network, may exist between the access conversion device and the gateway). Access-side physical port unit 510 is connected with an access node via an access device. When a physical layer signal is received, access-side physical port unit 510 resolves the multiplex physical layer load carried in the physical layer signal and outputs the multiplex physical layer load to multiplex conversion unit 520. Multiplex conversion unit 520 converts the multiplex physical layer load into a physical layer load in the unit of a complete data frame and then outputs the physical layer load to gateway-side physical port unit 530. Gateway-side physical port unit 530 carries the physical layer load in the unit of the data frame in a physical layer signal and sends the physical layer signal to the gateway equipment. After gateway-side physical port unit 530 receives a physical layer signal from the gateway equipment, gateway-side physical port unit 530 resolves the physical layer signal into a physical layer load in the unit of a data frame and outputs the physical layer load to multiplex conversion unit 520. Multiplex conversion unit 520 inversely converts the physical layer load in the unit of the data frame into a multiplex physical layer load and then outputs the multiplex physical layer load to access physical port unit 510. Access-side physical port unit 510 converts the multiplex physical layer load into a physical layer signal and then outputs the physical layer signal to the access device.

The difference among the first embodiment, the second embodiment and the third embodiment of the access conversion device lies in the different internal realization of multiplex conversion unit 520 due to the different multiplex technologies employed.

FIG. 17 is a structural diagram showing the first embodiment of the access conversion device. Multiplex conversion unit 520 includes multiplex tag module 521 and multiplex tag processing module 522. Multiplex tag processing module 522 is connected with access physical port unit 510, multiplex tag module 521 and gateway physical port unit 530.

The access conversion device in this embodiment may be used in combination with that in the second embodiment, the sixth embodiment and the seventh embodiment of the access device. The uplink physical layer load in the second embodiment, the sixth embodiment and the seventh embodiment of the access device includes a downlink physical port unit connected with the access node, in other words, a tag having a one-to-one correlation with the access node.

When access-side physical port unit 510 of the access conversion device receives an uplink physical layer signal from the access device, access-side physical port unit 510 resolves the physical layer load carried in the uplink physical layer signal and outputs the physical layer load to multiplex tag processing module 522. Multiplex tag processing module 522 extracts the tag in the physical layer load, generates a physical layer load in the unit of a complete data frame according to the tag, and determines whether the tag and the access node ID in the data frame have been saved in multiplex tag module 521. If the tag and the access node ID have not been saved or have changed, multiplex tag module 521 will be updated, so that the correlation between the current tag and the access node ID will be maintained in multiplex tag module 521. Multiplex tag processing module 522 outputs the physical layer load from which the tag is cleared, in the unit of the data frame to gateway-side physical port unit 530.

When the access device adds a tag to the physical layer load in the unit of the data frame, multiplex tag processing module 522 may obtain a physical layer load in the unit of the data frame after the tag is cleared. However, when the access device adds a tag to the physical layer load in the unit of a code stream with a fixed length, multiplex tag processing module 522 may recombine the physical layer loads with the same tag and obtain a physical layer load in the unit of the data frame after clearing the tag therein.

The access node ID is a field, which has a correlation with the access node and includes an MAC address, an IP address and a VLAN number of an access node, in a packet sent by the access node or a packet transmitted to the access node. After the access node in the access system is powered on, the access node first sends a packet to the gateway equipment side, so that the access conversion device may learn the correlation between the access node ID and the tag.

For the physical layer load in the unit of data frame received from gateway-side physical port unit 530, multiplex tag processing module 522 searches the tag corresponding to the access node ID in the data frame in multiplex tag module 521, and outputs the physical layer load to the access-side physical port unit 510 after adding the tag to the physical layer load.

For the access conversion device including more than one access-side physical port units 510 connected with multiplex tag processing module 522, multiplex tag processing module 522 may also store the access-side physical port unit 510 corresponding to the access node ID together in multiplex tag module 521. For the downlink physical layer load received from gateway-side physical port unit 530, when multiplex tag processing module 522 searches the tag corresponding to the access node ID in the data frame, multiplex tag processing module 522 searches the corresponding access-side physical port unit 510 at the same time, and outputs the downlink physical layer load with the tag added to access-side physical port unit 510.

It should be noted that: in this embodiment, the access conversion device can process the tag in a mode matching the access device connected therewith. If the access device multiplexes in the unit of the data frame, the access conversion device also processes the tag in the unit of the data frame. If the access device multiplexes at a fixed length, the access conversion device also performs a tag processing to a code stream with the fixed length, and the location of the tag in the data frame is the same as that in the code stream with the fixed length.

When the access system employs the sixth embodiment of the access device for networking, the tag in this embodiment is added to the code stream by the lowest-level multiplex unit of the access device and passes through all the upper-level multiplex units. When the access system employs the seventh embodiment of the access device for networking, the tag in this embodiment includes all offset tags for multiplex units of different levels.

FIG. 18 is a structural diagram showing the second embodiment of the access conversion device. Multiplex conversion unit 520 includes multiplex time sequence module 523, time sequence conversion module 524 and data frame identification module 525. Time sequence conversion module 524 is connected with access-side physical port unit 510, multiplex time sequence module 523 and data frame identification module 525, respectively. Data frame identification module 525 is connected with gateway-side physical port unit 530.

The access conversion device of this embodiment may be used in cooperation with the third embodiment of the access device. The uplink physical layer loads for the third embodiment and the eighth embodiment of the access device are both multiplexed according to the multiplex time sequence period. The length of the time slot in the multiplex time sequence period may be the same. The multiplex physical layer loads include code stream segments arranged corresponding to the order of the downlink physical port units connected with the access node, i.e. the access nodes.

For the multiplex physical layer load received from access-side physical port unit 510, time sequence conversion module 524 writes the multiplex physical layer load to the uplink buffer region of the time slot in segments in the unit of the time slot in the multiplex time sequence period, according to the order of the time slots. Data frame identification module 525 extracts the physical layer load from the uplink buffer region of the time slot in the unit of a complete data frame, and determines whether the access node ID in the data frame and the corresponding time slot have been saved in multiplex time sequence module 523. If the access node ID and the corresponding time slot have not been saved or have changed, multiplex time sequence module 523 will be updated, so that a correlation between the time slot and the access node ID will be maintained in multiplex time sequence module 523. Data frame identification module 525 outputs the physical layer load in the unit of the data frame to gateway-side physical port unit 530.

For the physical layer load in the unit of the data frame received from gateway-side physical port unit 530, data frame identification module 525 searches the time slot corresponding to the access node ID in the data frame in multiplex time sequence module 523, and writes the physical layer load in the unit of data frame to the downlink buffer region of the time slot. With the time slot in the multiplex time sequence period as the unit, time sequence conversion module 524 outputs a physical layer load of a certain length from the downlink buffer region of each time slot to access-side physical port unit 510 according to the order of the time slots.

Similarly, the access conversion device of this embodiment should employ a TDM mode matching the access device connected therewith, for example, the multiplex time sequence period, the number of time slots and the length of the time slot matching the access device. Therefore, it may be ensured that the physical layer load will be multiplexed and demultiplexed correctly at the two transmission ends.

FIG. 19 shows a structural diagram of the third embodiment of the access conversion device. Multiplex conversion unit 520 includes multiplex time sequence and time length module 526, time sequence and time length conversion module 527 and data frame identification module 525. Time sequence and time length conversion module 527 is connected with access-side physical port unit 510, multiplex time sequence and time length module 526 and data frame identification module 525, respectively. Data frame identification module 525 is connected with gateway-side physical port unit 530.

The access conversion device of this embodiment may be used in cooperation with the access device of the fourth embodiment and the ninth embodiment. The uplink physical layer loads in the access device of the fourth embodiment and the ninth embodiment are both multiplexed according to the multiplex time sequence period, and the lengths of the time slots in the multiplex time sequence period may be different. The multiplex physical layer loads include code stream segments arranged corresponding to the order of the downlink physical port units connected with the access node, i.e. the access nodes. The length of the code stream segment corresponds to the length of the time slot.

The length of the time slot and order of time slots in a multiplex time sequence period are prestored in multiplex time sequence and time length module 526.

For the multiplex physical layer load received from access-side physical port unit 510, time sequence and time length conversion module 527 writes the code stream segment in the multiplex physical layer load, whose length corresponds to the time slot length, into the uplink buffer region of the time slot according to the order of time slots with the time slot in the multiplex time sequence period as the unit. Data frame identification module 525 extracts a physical layer load from an uplink buffer region of a time slot in the unit of a complete data frame, and data frame identification module 525 determines whether the access node ID in the data frame and the corresponding time slot have been saved in multiplex time sequence and time length module 526. If the access node ID and the corresponding time slot have not been saved or have changed, multiplex time sequence and time length module 526 will be updated. Therefore, a correlation for the current time slot, the time slot length and the access node ID will be maintained in multiplex time sequence and time length module 526. Data frame identification module 525 outputs the physical layer load in the unit of the data frame to gateway-side physical port unit 530.

For the physical layer load in the unit of the data frame sent to the access node and received from gateway-side physical port unit 530, data frame identification module 525 searches the time slot corresponding to the access node ID in the data frame in multiplex time sequence and time length module 526, and writes the physical layer load to the downlink buffer region of the time slot. Time sequence and time length conversion module 527 outputs a physical layer load whose code stream length corresponds to the time slot length, from the downlink buffer region of each time slot to access-side physical port unit 510 according to the order of time slots.

Similarly, the access conversion device of this embodiment should employ a TDM mode matching the access device connected therewith, for example, the multiplex time sequence period, the number of time slots and the length of the time slot matching the access device, so as to ensure that the physical layer load can be multiplexed and demultiplexed correctly at the two transmission ends.

In the second Ethernet access system shown in FIG. 3, the multiplex gateway equipment needs to employ a multiplex technology in accordance with the access device for realizing access. The multiplex gateway equipment of the invention may be realized by integrating the main functional modules of the above access conversion device with a conventional gateway equipment. For example, one embodiment of the multiplex gateway equipment includes a physical port unit, a multiplex interface unit and a forwarding unit.

The physical port unit is adapted to perform a conversion between a physical layer signal of an input/output multiplex gateway equipment and a multiplex MAC layer code stream carried therein.

The multiplex interface unit is adapted to convert the multiplex MAC layer code stream received from the physical port unit into a data frame and output the data frame to the forwarding unit, and adapted to inversely convert the data frame received from the forwarding unit into a multiplex MAC layer code stream, and output the multiplex MAC layer code stream to the physical port unit.

The forwarding unit is adapted to forward the data frame.

In short, only two physical port units of the access conversion device need to be replaced with a physical port unit of the gateway and a forwarding unit of the gateway, respectively. And the modification and adaptation of the prior art, such as the alternation of the interface, will not be described again here.

It should be noted that: in the invention, all the physical port units in the access device, the multiplex gateway equipment and the access conversion device have the function for performing the conversion between physical layer signal and physical layer load. The function may be implemented with different methods according to different bandwidths, and may be realized with the technology of the conventional PHY chip.

Figure 20:
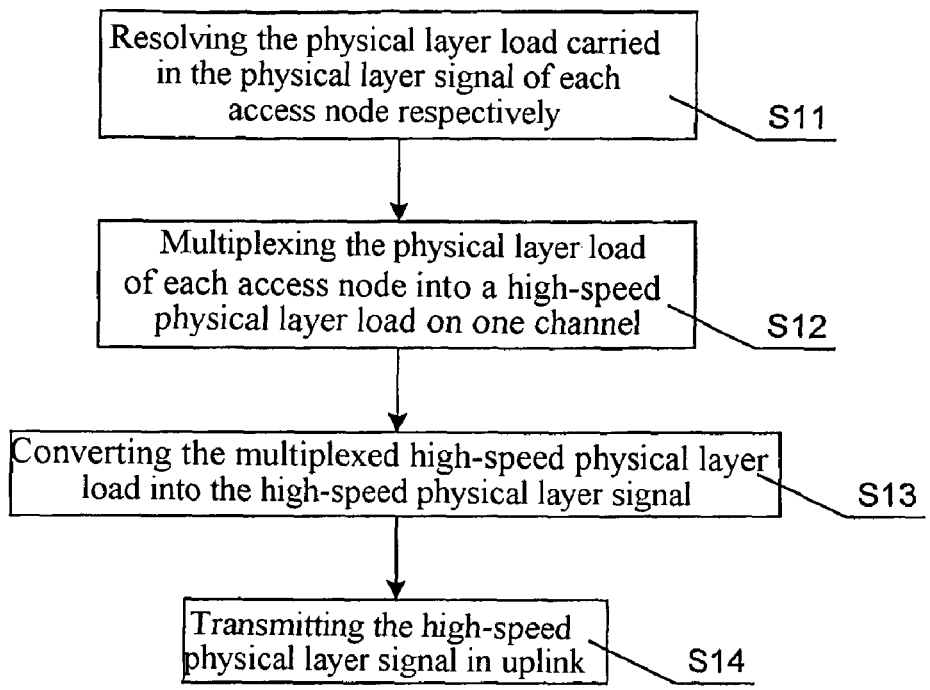
FIG. 20 is a flow chart showing the method for Ethernet uplink access according to an embodiment of the invention.

FIG. 20 is a flow chart showing the method for the Ethernet uplink multiplex access according to the invention. In Step S11, on the access node side, for low-speed physical layer signals received from different access nodes, the low-speed physical layer load corresponding to each access node is resolved respectively.

In Step S12, the low-speed physical layer loads of different access nodes are multiplexed into the high-speed physical layer load on one channel.

In Step S13, the multiplexed high-speed physical layer load is carried in a high-speed physical layer signal.

In Step S14, the high-speed physical layer signal is transmitted in uplink.

During the uplink multiplex access, the process for multiplexing the low-speed physical layer loads into the high-speed physical layer load on one channel in Step S12, may be a monolevel multiplex or a multilevel multiplex. The multilevel multiplex is performed in levels. The access nodes are first grouped, and the physical layer loads of the access nodes in each group are multiplexed into physical layer load on one channel for the group, then the physical layer loads of the group are multiplexed directly or multiplexed after being regrouped, till all the physical layer loads of the access nodes are multiplexed into physical layer load on one channel.

When the monolevel or the multilevel multiplex is performed in Step S12, the uplink multiplex technology in embodiments of the above access device may be employed, and a simple explanation thereof will be given. For details, a reference may be made to the above embodiments.

When a field in the data frame having a one-to-one correlation with the access node, in other words, when the access node ID is taken as the tag of the physical layer load, steps after Step S12 are the same as the prior art. When the TDM technology is employed, in Step S12, the physical layer load whose code stream length matches a time slot length will be output as physical layer load on one channel multiplexed in the time slot corresponding to a physical layer load before multiplexing in the time sequence period.

Offset tag is only applicable for the case of the multilevel multiplex. In Step S12, before the multiplex in each level, an offset tag, which has a one-to-one correlation with each physical layer load in the current multiplexing, is added to the physical layer load before multiplexing.

Figure 21:
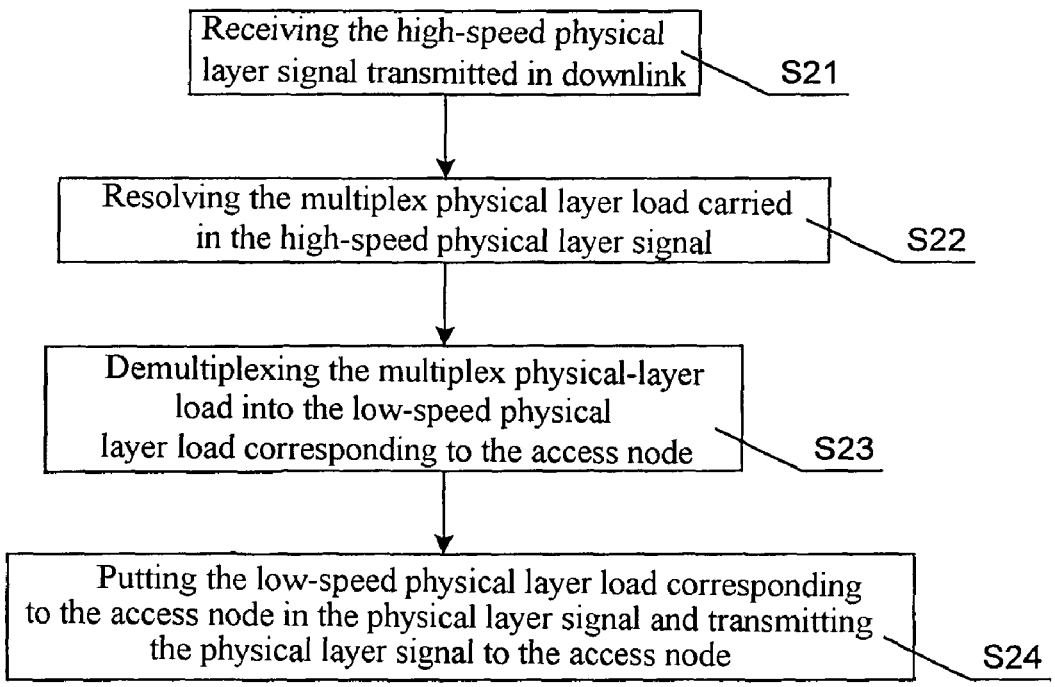
FIG. 21 is a flow chart showing the method for Ethernet downlink access according to an embodiment of the invention.

FIG. 21 is a flow chart showing the method for the Ethernet downlink multiplex access according to the invention. In Step S21, a high-speed physical layer signal transmitted downlink is received.

In Step S22, a multiplex physical layer load is resolved from the high-speed physical layer signal received.

In Step S23, the multiplex physical layer load is demultiplexed into a low-speed physical layer load corresponding to the access node.

In Step S24, the demultiplexed low-speed physical layer load is carried in a low-speed physical layer signal and sent to the corresponding access node.

During the above downlink multiplex access process, the process for demultiplexing the multiplex physical layer load into a physical layer load corresponding to the access node in Step S23, may be the monolevel demultiplex or the multilevel demultiplex. The multistage demultiplex is performed in levels. The multiplex physical layer load is first demultiplexed into multiple physical layer loads, and each physical layer load demultiplexed is re-demultiplexed respectively, till the physical layer load is demultiplexed into physical layer loads corresponding to the access node.

In Step S23, when monolevel or multilevel demultiplex is performed, the uplink multiplex technology in embodiments of the above access device may be employed, and a simple explanation thereof will be given. For details, a reference may be made to the above embodiments.

When a field in the data frame having a one-to-one correlation with the access node, i.e., when the access node ID is taken as the tag of the physical layer load, in Step S23, the demultiplex will be performed according to the access node ID. When the demultiplex is performed according to a tag having a one-to-one correlation with the access node in the multiplex physical layer load, the tag in the code stream should be removed before the physical layer load corresponding to the access node is converted into a low-speed physical layer signal. When the TDM technology is employed, in Step S23, a physical layer load before demultiplexing whose code stream length matches the time slot length is output as the demultiplexed physical layer load on one channel corresponding to a time slot, in the time slot corresponding to the physical layer load before multiplexing in the time sequence period.

The offset tag is only applicable for the case of the multilevel multiplex. In Step S23, the demultiplex in each level is performed according to the offset tag in the physical layer load before demultiplexing which has a one-to-one correlation with each of the demultiplexed physical layer loads, and the offset tag in the physical layer load for performing the current demultiplexing is cleared during each demultiplexing step.

For the invention, the access node may employ the existing standard Ethernet physical layer rate. However, as for a non-standard Ethernet physical layer transmission rate which may occur in the future, such as 2M, 40M and 80M, etc., the non-standard transmission rates may also be employed as long as the two ends of the physical link both support the non-standard transmission rates. Similarly, when the uplink physical port of the access device for outputting the high-speed physical layer signal is not the standard Ethernet physical layer rate or when part of the physical ports is not the standard Ethernet ports, the invention may also be applicable as long as the two ends of the physical link can support and carry the Ethernet physical layer load simultaneously. In a broader meaning, the invention does not concern the specific physical layer processing on both ends of the physical link. This is apparent to those skilled in the art.

In the invention, the networking structure from the access node to the gateway equipment in the access system is simple, and the traffic of the access node will be sent to an upper-layer equipment for processing after multiplexing by the access device. Relative to the conventional access system, in the invention, the layer-2 forwarding process is not needed and only the layer-1 forwarding process is needed. Hence, relative to the layer-2 switch access, the access reliability is improved. As the scale of the commercial application based on the embodiments of the invention is expanded, the cost of the access device according to the invention may be about one-tenth of that of the conventional switch, and the space of the access device may be small enough to be placed in a building. For operators, the access equipment is reliable and inexpensive. For users, the access may be implemented via a computer network card directly without the modulation/demodulation equipment and the dialer software, thus the convenience may be provided and the cost may be lowered. For the case that the number of users is large and the distribution of users is dense, access devices employing the cascade multiplex will be more suitable.

According to the invention, a networking solution for an Ethernet broadband access system is provided by combining the multiplex technology and the Ethernet technology, so that the cost of the broadband access may be lowered greatly, the architecture of the access network may be simplified, and a high and reliable access rate may be obtained.

Additional advantages and modifications will readily occur to those skilled in the art. Therefore, the invention in its broader aspects is not limited to the specific details and representative embodiments shown and described herein. Accordingly, various modifications and variations may be made without departing from the spirit or scope of the invention as defined by the appended claims and their equivalents.

The invention claimed is:

1. An Ethernet access device, located between a plurality of access nodes and a gateway equipment, comprising at least two downlink physical port units, a multiplex/demultiplex unit and an uplink physical port unit, wherein:
the downlink physical port unit is adapted to perform a conversion between a low-speed physical layer signal input to or output from the access device and a low-speed physical layer load carried in the low-speed physical layer signal;
the uplink physical port unit is adapted to perform a conversion between a high-speed physical layer signal input to or output from the access device and a high-speed physical layer load carried in the high-speed physical layer signal; and
the multiplex/demultiplex unit is adapted to perform a multiplex or a demultiplex for the low-speed physical layer load of the downlink physical port unit and the high-speed physical layer load of the uplink physical port unit according to a tag in the physical layer load corresponding to the downlink;
wherein the multiplex/demultiplex unit comprises a tag storage module, a tag module and a code stream multiplex module, wherein:
the tag storage module is adapted to store the tag and the correlation between the tag and the downlink physical port unit;
the tag module is adapted to add the tag corresponding to the downlink physical port unit to the low-speed physical layer load input from the downlink physical port unit and output the low-speed physical layer load to the code stream multiplex module, and remove the tag from the physical layer load input from the code stream multiplex module and output the low-speed physical layer load to the downlink physical port unit corresponding to the tag; and
the code stream multiplex module is adapted to perform a conversion between the low-speed physical layer load of the tag module and the high-speed physical layer load of the uplink physical port unit.

2. The Ethernet access device according to claim 1, wherein, the tag is a field in a data frame in the physical layer load, and the field has a correlation with the downlink physical port unit;
the multiplex/demultiplex unit comprises a tag storage module and a frame multiplex module, wherein:
the tag storage module is adapted to store the tag and the correlation between the tag and the downlink physical port unit corresponding to the tag; and
the frame multiplex module is adapted to convert the low-speed physical layer load input from the downlink physical port unit into the high-speed physical layer load in the unit of the data frame and output the high-speed physical layer load to the uplink physical port unit, and convert the high-speed physical layer load input from the uplink physical port unit into the low-speed physical layer load in the unit of the data frame and output the low-speed physical layer load to the downlink physical port unit corresponding to the tag.

3. The Ethernet access device according to claim 1, wherein, the tag module adds the tag to or removes the tag from the physical layer load in the unit of the data frame or in the unit of a code stream with a fixed length.

4. The Ethernet access device according to claim 1, wherein, the multiplex/demultiplex unit performs the multiplex and demultiplex periodically according to a time sequence period, and the time sequence period comprises time slots corresponding to the downlink physical port units.

5. The Ethernet access device according to claim 4, wherein, lengths of the time slots corresponding to the downlink physical port units in the time sequence period are the same;
the multiplex/demultiplex unit comprises a time sequence storage module and a fixed length multiplex module, wherein:
the time sequence storage module is adapted to store the correlation between the time slot in the time sequence period and the downlink physical port unit; and
the fixed length multiplex module is adapted to convert the low-speed physical layer load received from the downlink physical port unit into the high-speed physical layer load on one channel and output the high-speed physical layer load on one channel to the uplink physical port unit in each time slot, and convert the high-speed physical layer load received from the uplink physical port unit into the low-speed physical layer load and output the low-speed physical layer load to the downlink physical port unit in each time slot.

6. The Ethernet access device according to claim 4, wherein, the multiplex/demultiplex unit comprises a time sequence and time length storage module and a variable length multiplex module, wherein:
the time sequence and time length storage module is adapted to store the length of the time slot in the time sequence period and the correlation between the time slot and the downlink physical port unit; and
the variable length multiplex module is adapted to convert the low-speed physical layer load which is received from the downlink physical port unit and has a code stream length matching the time slot length, into the high-speed physical layer load on one channel and output the high-speed physical layer load to the uplink physical port unit in each time slot, and convert the high-speed physical layer load received from the uplink physical port unit into the low-speed physical layer load and output the low-speed physical layer load which has the code stream length matching the time slot length, to the downlink physical port unit in each time slot.

7. A method for Ethernet access, comprising:
multiplexing physical layer loads carried in physical layer signals of at least two access nodes into physical layer load on one channel, the process of multiplexing the physical layer loads of the access node into the physical layer load on one channel comprises: multiplexing the multiple physical layer loads from the access node into physical layer load groups; and
multiplexing each physical layer load group directly or multiplexing each physical layer load group after regrouping, till the physical layer loads are multiplexed into the physical layer load on one channel;
converting a multiplexed physical layer load into a high-speed physical layer signal, and then transmitting the high-speed physical layer signal in uplink;
demultiplexing the multiplexed physical layer load on one channel carried in the downlink high-speed physical layer signal into physical layer loads corresponding to at least two access nodes, the process of demultiplexing the multiplexed physical layer load on one channel into physical layer loads corresponding to the access nodes comprises: demultiplexing the multiplex physical layer load into multiple physical layer loads; and re-demultiplexing each physical layer load demultiplexed, till the multiplexed physical layer load on one channel is demultiplexed into physical layer loads corresponding to the access nodes; and
converting demultiplexed physical layer loads into low-speed physical layer signals, and then transmitting the low-speed physical layer signals in downlink;
wherein, before each multiplexing, further comprises: adding an offset tag having a one-to-one correlation with each physical layer load in current multiplexing, to the physical layer load before multiplexing;
performing the demultiplexing according to the offset tag having the one-to-one correlation between the physical layer load after demultiplexing and the physical layer load before demultiplexing; and
during the demultiplexing, the method further comprises: removing the offset tag for performing the demultiplexing from the physical layer load.

8. The method for Ethernet access according to claim 7, wherein, before multiplexing the physical layer loads, the method further comprises: adding a tag having a correlation with the access node, to the physical layer load of the access node;
performing the process of demultiplexing the physical layer load on one channel into multiple physical layer loads according to the tag having the correlation with the access node in the physical layer load; and
before converting the physical layer load corresponding to the access node into a low-speed physical layer signal, the method further comprises: removing the tag from the physical layer load corresponding to the access node.

9. The method for Ethernet access according to claim 7, wherein, the multiple physical layer loads are multiplexed into physical layer load on one channel periodically according to a time sequence period; the time sequence period comprises a time slot corresponding to the physical layer load before multiplexing; physical layer loads before multiplexing are output as the multiplexed physical layer load on one channel in the time slot, and the length of the physical layer load before multiplexing matches the length of the time slot;
the physical layer load on one channel is demultiplexed into multiple physical layer loads periodically according to a time sequence period; the time sequence period comprises a time slot corresponding to a demultiplexed physical layer load, and the physical layer load whose code stream length before demultiplexing matches the time slot length is output as the physical layer load after demultiplexing in each time slot.

10. The method for Ethernet access according to claim 7, wherein, demultiplexing physical layer load on one channel into multiple physical layer loads is performed according to a field in the data frame of the physical layer load having the correlation with the access node.

* * * * *